(12) United States Patent
Noguchi et al.

(10) Patent No.: US 8,179,340 B2
(45) Date of Patent: May 15, 2012

(54) TWO-DIMENSIONAL CODE PATTERN, TWO-DIMENSIONAL CODE PATTERN DISPLAY DEVICE, AND ITS READING DEVICE

(75) Inventors: Ryoji Noguchi, Tsurugashima (JP); Manabu Nohara, Tsurugashima (JP); Takayuki Akimoto, Tsurugashima (JP); Tomoaki Iwai, Tsurugashima (JP); Yusuke Soga, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 614 days.

(21) Appl. No.: 12/304,940

(22) PCT Filed: Jun. 15, 2007

(86) PCT No.: PCT/JP2007/062116
§ 371 (c)(1),
(2), (4) Date: Jan. 15, 2009

(87) PCT Pub. No.: WO2007/145317
PCT Pub. Date: Dec. 21, 2007

(65) Prior Publication Data
US 2009/0207101 A1    Aug. 20, 2009

(30) Foreign Application Priority Data
Jun. 16, 2006 (JP) .................... 2006-167723

(51) Int. Cl.
| G09G 3/20 | (2006.01) |
| G09G 5/08 | (2006.01) |
| G06F 3/033 | (2006.01) |
| G06K 7/10 | (2006.01) |
| G06K 7/14 | (2006.01) |
| B32B 3/00 | (2006.01) |
| B32B 5/16 | (2006.01) |
| B32B 7/14 | (2006.01) |

(52) U.S. Cl. ........... 345/55; 345/158; 235/454; 428/204
(58) Field of Classification Search .................. 345/427, 345/506, 87, 158, 589, 592; 382/297, 159, 382/131, 240, 141, 233, 181, 260, 100, 154, 382/103, 128, 276, 120, 243, 125, 291, 144, 382/270; 353/122; 34/255; 250/492.2, 231.1; 356/612, 420, 608; 398/187; 355/67; 235/494, 235/454, 462.09, 462.1, 462.12, 462.15, 235/462.25, 468; 358/448, 3.03, 463, 300, 358/3.08, 3.28, 426.02, 504, 530; 435/4; 712/32; 600/118; 341/137; 717/103; 348/14.01; 375/240.24; 1/1; 463/1; 438/7

See application file for complete search history.

(56) References Cited

U.S. PATENT DOCUMENTS
5,862,271 A    1/1999 Petrie
(Continued)

FOREIGN PATENT DOCUMENTS
JP    10-187912    7/1998
(Continued)

Primary Examiner — Quan-Zhen Wang
Assistant Examiner — Lin Li
(74) Attorney, Agent, or Firm — Drinker Biddle & Reath LLP

(57) ABSTRACT

A two-dimensional code pattern includes: a boundary pattern in which each of pixels in a group are set into a turn-on state or a turn-off state; a rotation detection pattern in which each pixel belonging to a group in each block is set into the turn-on state or the turn-off state by a light emitting pattern which can detect a rotational angle upon reading of the block; and an information pattern in which both of each pixel belonging to a first quadrant region in the block and each pixel belonging to a third quadrant region are set into the turn-on state or the turn-off state according to first information data and both of each pixel belonging to a second quadrant region and each pixel belonging to a fourth quadrant region are set into the turn-on state or the turn-off state according to second information data.

17 Claims, 23 Drawing Sheets

U.S. PATENT DOCUMENTS

| | | | |
|---|---|---|---|
| 7,692,630 B2 * | 4/2010 | Natsume et al. | 345/158 |
| 2007/0023523 A1 * | 2/2007 | Onishi | 235/454 |
| 2007/0042165 A1 * | 2/2007 | Wang et al. | 428/204 |
| 2007/0098234 A1 * | 5/2007 | Fiala | 382/120 |
| 2007/0104363 A1 * | 5/2007 | Yoshiura et al. | 382/165 |
| 2008/0095440 A1 * | 4/2008 | Onishi et al. | 382/181 |

FOREIGN PATENT DOCUMENTS

| | | |
|---|---|---|
| JP | 11-201797 | 7/1999 |
| JP | 2002-082763 | 3/2002 |

* cited by examiner

FIG. 2

|  | $\alpha_1$ ↓ | $\alpha_2$ ↓ | $\alpha_3$ ↓ | $\alpha_4$ ↓ | $\alpha_5$ ↓ | $\alpha_6$ ↓ |
|---|---|---|---|---|---|---|
| $\beta_1$ → | 1 | 1 | 1 | 1 | 1 | 1 |
| $\beta_2$ → | 1 | 1 | 0 | 0 | 0 | 0 |
| $\beta_3$ → | 1 | 0 | X0 | X1 | X2 | X3 |
| $\beta_4$ → | 1 | 0 | X4 | X5 | X6 | X7 |
| $\beta_5$ → | 1 | 0 | Y0 | Y1 | Y2 | Y3 |
| $\beta_6$ → | 1 | 0 | Y4 | Y5 | Y6 | 0 |

FIG. 7
(a)
FEBRUARY 28 (TUE)
(b)
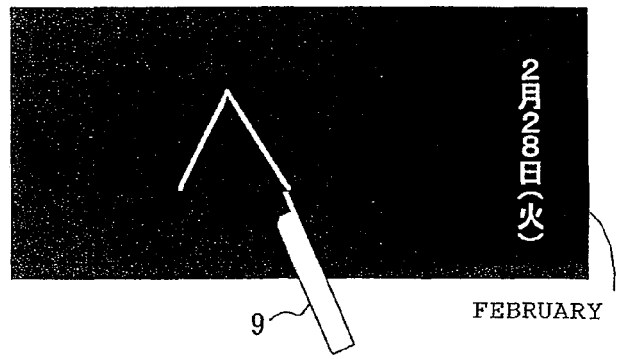
9
FEBRUARY 28 (TUE)

[BLOCK REFERENCE POINT: REGION A]

CASE WHERE THE COORDINATE POSITIONS IN THE X
DIRECTION ARE EXTRACTED BY EXECUTION OF STEP
S96 AND THE COORDINATE POSITIONS IN THE Y
DIRECTION ARE EXTRACTED BY EXECUTION OF STEP
S98

[BLOCK REFERENCE POINT: REGION B]

CASE WHERE THE COORDINATE POSITIONS IN THE X
DIRECTION ARE EXTRACTED BY EXECUTION OF STEP
S111 AND THE COORDINATE POSITIONS IN THE Y
DIRECTION ARE EXTRACTED BY EXECUTION OF STEP
S117

[BLOCK REFERENCE POINT: REGION C]

CASE WHERE THE COORDINATE POSITIONS IN THE X DIRECTION ARE EXTRACTED BY EXECUTION OF STEP S137 AND THE COORDINATE POSITIONS IN THE Y DIRECTION ARE EXTRACTED BY EXECUTION OF STEP S138

FIG. 21
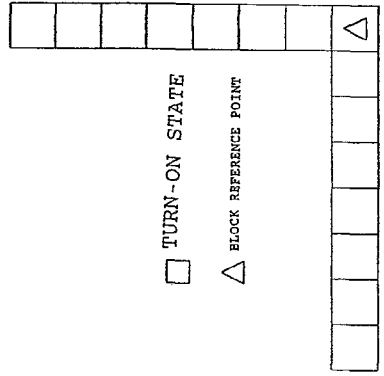
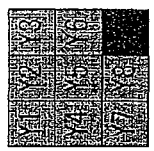
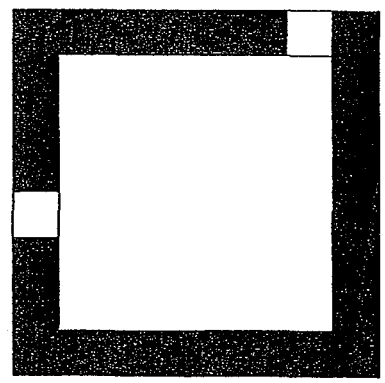
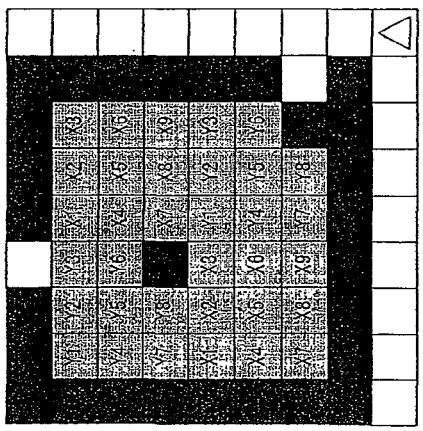

TWO-DIMENSIONAL CODE PATTERN, TWO-DIMENSIONAL CODE PATTERN DISPLAY DEVICE, AND ITS READING DEVICE

TECHNICAL FIELD

The invention relates to a two-dimensional code pattern which expresses information data by a two-dimensional image pattern, a two-dimensional code pattern display device, and its reading device.

BACKGROUND ART

Nowadays, as a two-dimensional code which expresses information data of n bits by a two-dimensional image pattern, various kinds of information codes such as a QR (Quick Response) code are used. In recent years, there has been proposed a coordinates input system in which by making a light pen come into contact with a display screen of a display, a coordinate position in the display screen with which the light pen has been come into contact can be detected (for example, refer to Patent Document 1). In the coordinates input system, two-dimensional codes each showing the coordinate position in the display screen are displayed on the corresponding coordinate positions in a matrix form. In this instance, the light pen photographs a two-dimensional code pattern displayed on the display screen of the display at the contact position, thereby obtaining the coordinate position on the display screen with which the light pen is in contact.

FIG. 1 is a diagram showing a coordinates pattern which is displayed on the display in the coordinates input system.

The coordinates pattern illustrated in FIG. 1 is constructed by a plurality of blocks each showing one coordinate position by 6 dots in the lateral direction and 6 dots in the vertical direction. 6 dots at a left edge and 6 dots at an upper edge of each block are always set into a turn-off state (shown by black painted dots). Each of other dots is set into a turn-on or turn-off state in accordance with the pattern showing its coordinate position.

FIG. 2 is a schematic diagram showing a construction of one block in the coordinates pattern illustrated in FIG. 1.

In FIG. 2, when display data corresponding to each dot is equal to 1, this means that the dot is in the turn-off state. When it is equal to 0, this means that the dot is in the turn-on state. As shown in FIG. 2, therefore, the turn-on and turn-off patterns shown by a dot train of two rows at the upper edge, a dot train of two columns at the left edge, and the dot at the rightmost lower position are common among all blocks. Since all of the dots existing on a boundary line of each block are, consequently, fixed to the turn-off state, as shown in FIG. 1, a lattice-shaped image pattern in which a display region has been divided every block as a whole coordinates pattern is displayed. A dot of $\alpha 2 \cdot \beta 2$ shown in FIG. 2 is a dot showing a reference of the coordinates in one block, what is called, a coordinates reference point.

In each block, 15 dots other than the dot to which the fixed display data has been allocated as mentioned above are used to display information showing a relative position of this block in the whole coordinates pattern. Dots X0 to X7 shown in FIG. 2 indicate the X coordinate positions in the block by the turn-on state/turn-off state of each dot. Dots Y0 to Y6 indicate the Y coordinate positions in the block by the turn-on state/turn-off state of each dot.

When the coordinates information is obtained from the coordinates pattern shown in FIG. 1, therefore, the light pen first detects a position of a block boundary dot train in which the turn-off states of 6 dots continue in the vertical direction and the turn-off states of 6 dots continue in the lateral direction on the basis of a photograph image signal obtained by photographing the coordinates pattern. In this process, if the block boundary dot train, that is, a dot train of $\{\beta 1, \alpha 1\}$ to $\{\beta 1, \alpha 6\}$ in FIG. 2 and a dot train of $\{\beta 2, \alpha 1\}$ to $\{\beta 6, \alpha 1\}$ can be detected, the positions of the dots X0 to X7 and the dots Y0 to Y6 shown in FIG. 2 can be specified. The light pen, therefore, simultaneously photographs regions of nine blocks, that is, the regions of (6 dots×3 times) in the vertical direction×(6 dots×3 times) in the lateral direction so that the image signal corresponding to at least one block is always included in the photograph image signal. On the basis of the position of the block boundary dot train detected from the photograph image signal, the light pen extracts the image pattern corresponding to each of the dots X0 to X7 and Y0 to Y6 from the photograph image signal and obtains the coordinate position shown by the image pattern.

In the above method, therefore, in order to allow one block to be always included in the photograph image signal, the signal process as mentioned above has to be executed to the photograph image signal obtained by photographing the regions which are nine times as large as the block. There is, consequently, such a problem that a processing time which is required to read the two-dimensional code pattern is long.

Patent Document 1: Japanese Patent Kokai No. 2002-082763

DISCLOSURE OF THE INVENTION

Problem to be Solved by the Invention

It is an object of the invention to provide a two-dimensional code pattern which can be precisely read out at a high speed, a two-dimensional code pattern display device, and its reading device.

Means for Solving the Problem

A two-dimensional code pattern according to the present invention is a two-dimensional code pattern constructed by blocks of pixels arranged in N columns×M rows, and comprising: a boundary pattern in which each pixel belonging to a predetermined first pixel group in each of the blocks is set into a turn-on state or a turn-off state by a predetermined light emitting pattern showing a boundary position; a rotation detection pattern in which each pixel belonging to a predetermined second pixel group in each of the blocks is set into the turn-on state or the turn-off state by a light emitting pattern which can detect a rotational angle upon reading of the block; and an information pattern in which in each of first to fourth quadrant regions in the block, both of each of the pixels belonging to the first quadrant region and each of the pixels belonging to the third quadrant region are set into the turn-on state or the turn-off state according to first information data and both of each of the pixels belonging to the second quadrant region and each of the pixels belonging to the fourth quadrant region are set into the turn-on state or the turn-off state according to second information data.

A display device for displaying a two-dimensional code pattern according to the present invention is a display device for displaying a two-dimensional code pattern constructed by blocks of pixels arranged in N columns×M rows, wherein the two-dimensional code pattern comprises: a boundary pattern in which each pixel belonging to a predetermined pixel group in each of the blocks is set into a turn-on state or a turn-off state by a predetermined light emitting pattern showing a boundary position; a rotation detection pattern in which each pixel belonging to a predetermined second pixel group in each of the blocks is set into the turn-on state or the turn-off state by a light emitting pattern which can detect a rotational angle upon reading of the block; and an information pattern in which in each of first to fourth quadrant regions in the block, both of each of the pixels belonging to the first quadrant region and each of the pixels belonging to the third quadrant region are set into the turn-on state or the turn-off state according to first information data and both of each of the pixels belonging to the second quadrant region and each of the pixels belonging to the fourth quadrant region are set into the turn-on state or the turn-off state according to second information data, and the display device has display driving means for displaying a plurality of two-dimensional code patterns in a display screen in a matrix form.

A reading device according to the invention is a reading device for reading a two-dimensional code pattern from a display screen or printed matter on which a plurality of two-dimensional code patterns each of which is constructed by blocks of pixels arranged in N columns×M rows are arranged and displayed in a matrix form, wherein each of the two-dimensional code patterns comprises a boundary pattern in which each pixel belonging to a predetermined pixel group in each of the blocks is set into a turn-on state or a turn-off state by a predetermined light emitting pattern showing a boundary position, a rotation detection pattern in which each pixel belonging to a predetermined second pixel group in each of the blocks is set into the turn-on state or the turn-off state by a light emitting pattern which can detect a rotational angle upon reading of the block, and an information pattern in which in each of first to fourth quadrant regions in the block, both of each of the pixels belonging to the first quadrant region and each of the pixels belonging to the third quadrant region are set into the turn-on state or the turn-off state according to first information data and both of each of the pixels belonging to the second quadrant region and each of the pixels belonging to the fourth quadrant region are set into the turn-on state or the turn-off state according to second information data, and the reading device comprises: an image sensor for obtaining a photograph image signal obtained by photographing the display screen or the printed matter every photographing range corresponding to the block; means for detecting a point, as a block reference point, at which the boundary patterns cross each other from the photograph image signal; and means for respectively extracting the first information data and the second information data on the basis of the turn-on state and the turn-off state of each of the pixels belonging to a region corresponding to an existing position of the block reference point in the photographing range.

EFFECT OF THE INVENTION

Even if the photographing range at the time of photographing the display screen or a sheet surface has a size corresponding to one block in the two-dimensional code pattern and even if the reading is executed at any position, the information data can be obtained. Since an amount of data as a processing target is, therefore, smaller than that in the case where, in order to read all of the blocks, the regions of the number which is a few times as large as the region of the block are photographed and the information data is extracted from the photograph image signals, the high speed reading is executed.

BRIEF DESCRIPTION OF THE DRAWINGS

{FIG. 2} Schematic diagram showing a construction of one block in the coordinates pattern shown in FIG. 1.

{FIG. 7} Diagram showing examples of a blackboard image which is displayed on the PDP 100.

{FIG. 21} Diagram showing another example of the coordinates reading unit block.

EXPLANATION OF REFERENCE SIGNS OF MAJOR PART

Figure 1:
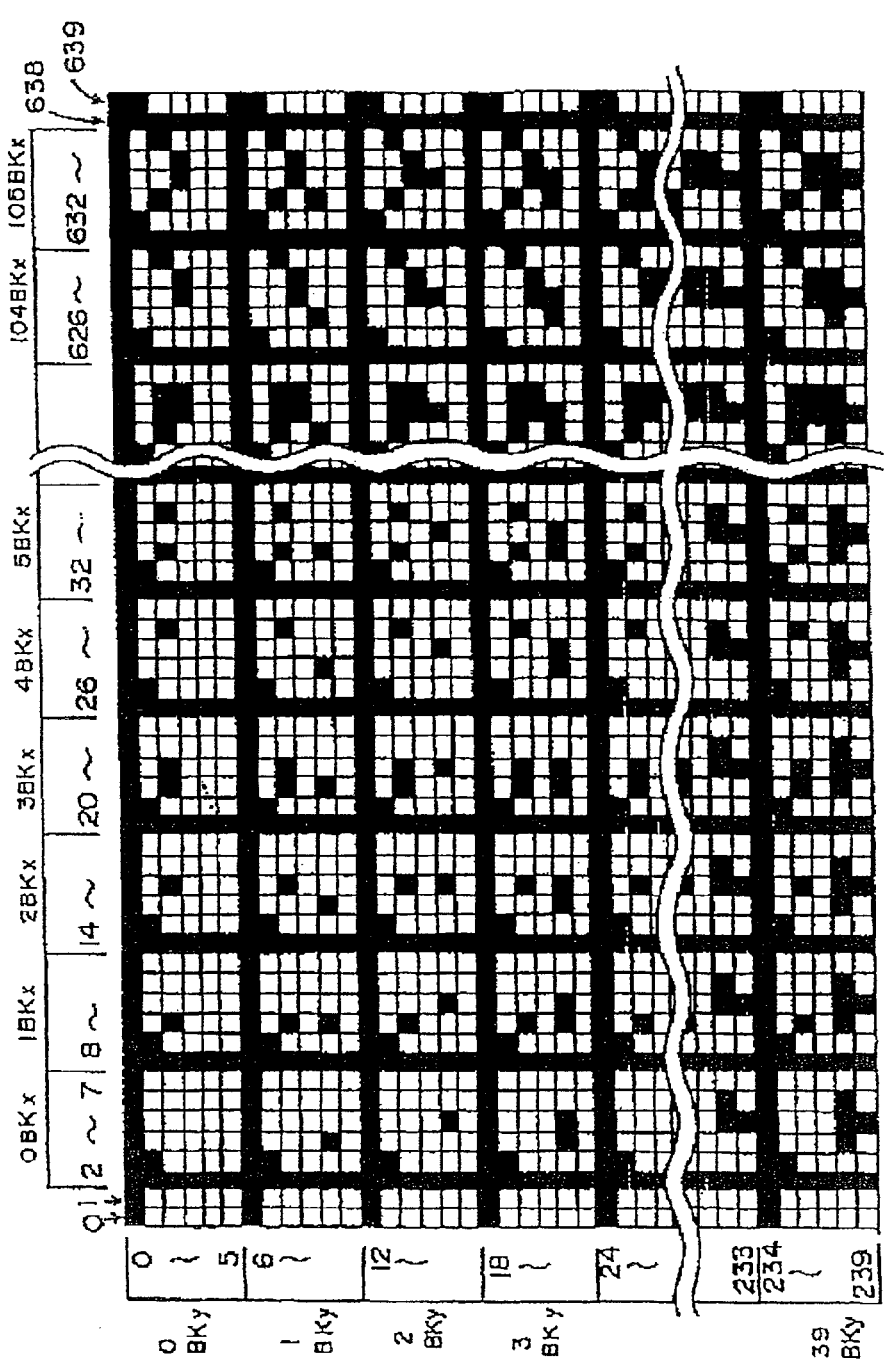
{FIG. 1} Diagram illustrating a display form of a conventional coordinates pattern.

4 . . . Drive control circuit
7, 16 . . . two-dimensional code converting circuit
9 . . . Electronic chalk
91 . . . Image sensor
96 . . . Coordinates information extracting circuit
100 . . . Plasma display panel

BEST MODE FOR CARRYING OUT THE INVENTION

A two-dimensional code pattern according to the invention includes: a boundary pattern in which each pixel belonging to a predetermined first pixel group in each of blocks of pixels arranged in N columns×M rows is set into a turn-on state or a turn-off state by a predetermined light emitting pattern showing a boundary position; a rotation detection pattern in which each pixel belonging to a predetermined second pixel group in each of the blocks is set into the turn-on state or the turn-off state by a light emitting pattern which can detect a rotational angle upon reading of the block; and an information pattern in which both of each of the pixels belonging to a first quadrant region in the block and each of the pixels belonging to a third quadrant region are set into the turn-on state or the turn-off state according to first information data and both of each of the pixels belonging to a second quadrant region and each of the pixels belonging to a fourth quadrant region are set into the turn-on state or the turn-off state according to second information data. In this instance, in the invention, an image in which a plurality of two-dimensional code patterns are arranged in a matrix form is displayed on a display screen of a display. When the two-dimensional code patterns are read out of the display screen or sheet surface on which the plurality of two-dimensional code patterns have been displayed in a matrix form as mentioned above, first, the display screen or printed matter is photographed every photographing range corresponding to the block, thereby obtaining a photograph image signal. Subsequently, a point at which the boundary patterns cross each other is detected, as a block reference point, from the photograph image signal. The first and second information data are respectively extracted on the basis of the turn-on state and the turn-off state of each of the pixels belonging to a region corresponding to an existing position of the block reference point in the photographing range.

Embodiments

Figure 3:
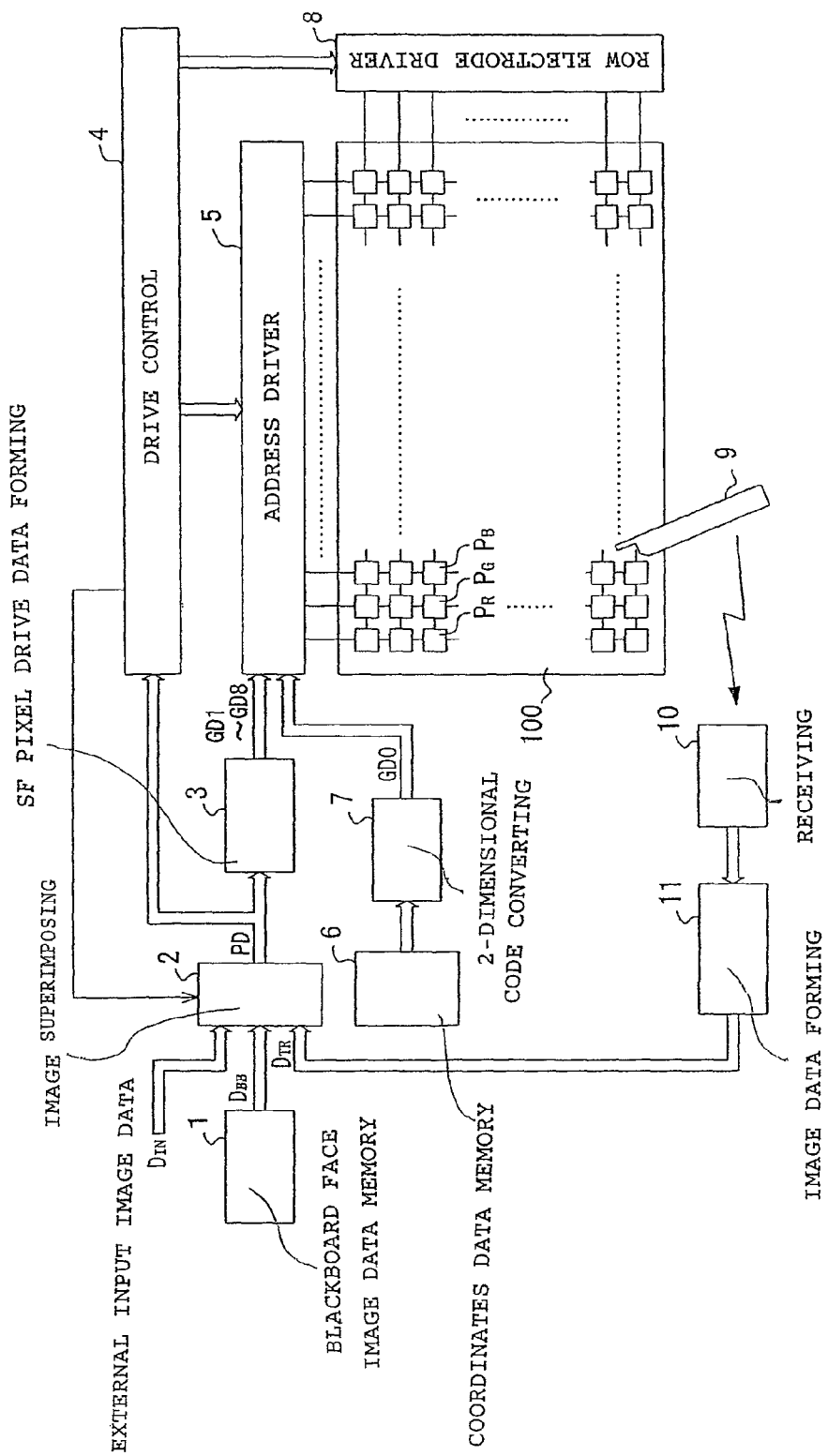
{FIG. 3} Diagram showing a schematic construction of an electronic blackboard on which two-dimensional code patterns obtained by converting coordinates information by using the invention are displayed and read out.

FIG. 3 is a diagram showing a construction of an electronic blackboard based on the invention.

According to the electronic blackboard, when the user moves a tip of an electronic chalk (which will be described hereinafter) in a state where the tip is in contact with a display screen of a plasma display panel, a moving locus is displayed as it is on the display screen.

In FIG. 3, a plasma display panel 100 (hereinbelow, referred to as a PDP 100) as an electronic blackboard main body has a transparent front panel (not shown) serving as a blackboard face and a rear panel (not shown). A discharge space in which a discharge gas has been sealed exists between the front panel and the rear panel. A plurality of row electrodes extending in the horizontal direction (lateral direction) of each display surface are formed on the front panel. A plurality of column electrodes extending in the vertical direction (longitudinal direction) of the display surface are formed on the rear panel. A pixel cell is formed in a crossing portion (including the discharge space) of each row electrode and a column electrode. As shown in FIG. 3, the pixel cell is constructed by three kinds of pixel cells: a pixel cell $P_R$ which emits light in red; a pixel cell $P_G$ which emits light in green; and a pixel cell $P_B$ which emits light in blue.

Blackboard face image data showing a blackboard face (for example, all in black) to be displayed on the whole display screen of the PDP 100 has previously been stored in a blackboard face image data memory 1. The blackboard face image data is sequentially read out of the blackboard face image data memory 1 and it is supplied as blackboard face image data $D_{BB}$ to an image superimposing circuit 2.

The image superimposing circuit 2 forms pixel data PD showing, every pixel cell P, an image obtained by superimposing a blackboard face image shown by the blackboard face image data $D_{BB}$, an image shown by an external input image data signal $D_{IN}$, and an image shown by a display image data signal $D_{TR}$ (which will be explained hereinafter) and supplies to each of an SF pixel drive data forming circuit 3 and a drive control circuit 4. When a blackboard display cancel signal is supplied to the image superimposing circuit 2 from the drive control circuit 4 (which will be explained hereinafter), the image superimposing circuit 2 supplies the pixel data PD showing, every pixel cell P, an image obtained by superimposing the image shown by the external input image data signal $D_{IN}$ and the image shown by the display image data signal $D_{TR}$ to each of the SF pixel drive data forming circuit 3 and the drive control circuit 4.

The SF pixel drive data forming circuit 3 forms pixel drive data GD1 to GD8, every pixel data PD, each for setting a state of each pixel cell P into one of the states of a turn-on mode and a turn-off mode in each of subfields SF1 to SF8 (which will be explained hereinafter) in accordance with a luminance level shown by the pixel data PD and supplies to an address driver 5.

Figure 4:
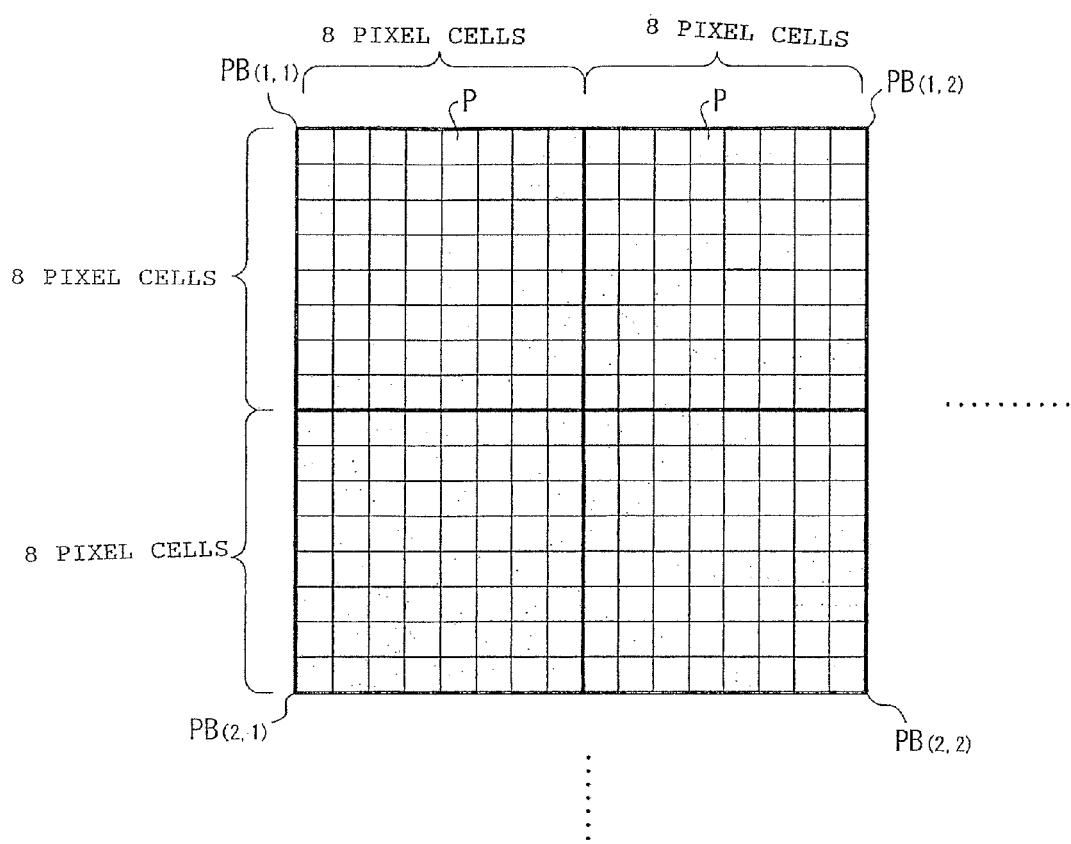
{FIG. 4} Diagram showing a part of a layout of pixel cells P and pixel blocks PB in a PDP 100 shown in FIG. 3.

Every pixel block constructed by a plurality of adjacent pixel cells P, coordinates data showing a coordinate position (X, Y) in the display screen of the PDP 100 where the pixel block is located has previously been stored in a coordinates data memory 6. For example, every pixel block PB (region surrounded by bold frames) constructed by pixel cells P of (8 rows×8 columns) as shown in FIG. 4, the coordinates data showing the coordinate positions in the X direction (lateral direction) and the Y direction (vertical direction) in the display screen of the PDP 100 in the pixel block PB has been stored in the coordinates data memory 6 in correspondence to the pixel block. The coordinates data is read out of the coordinates data memory 6 and supplied to a two-dimensional code converting circuit 7.

Figure 5:
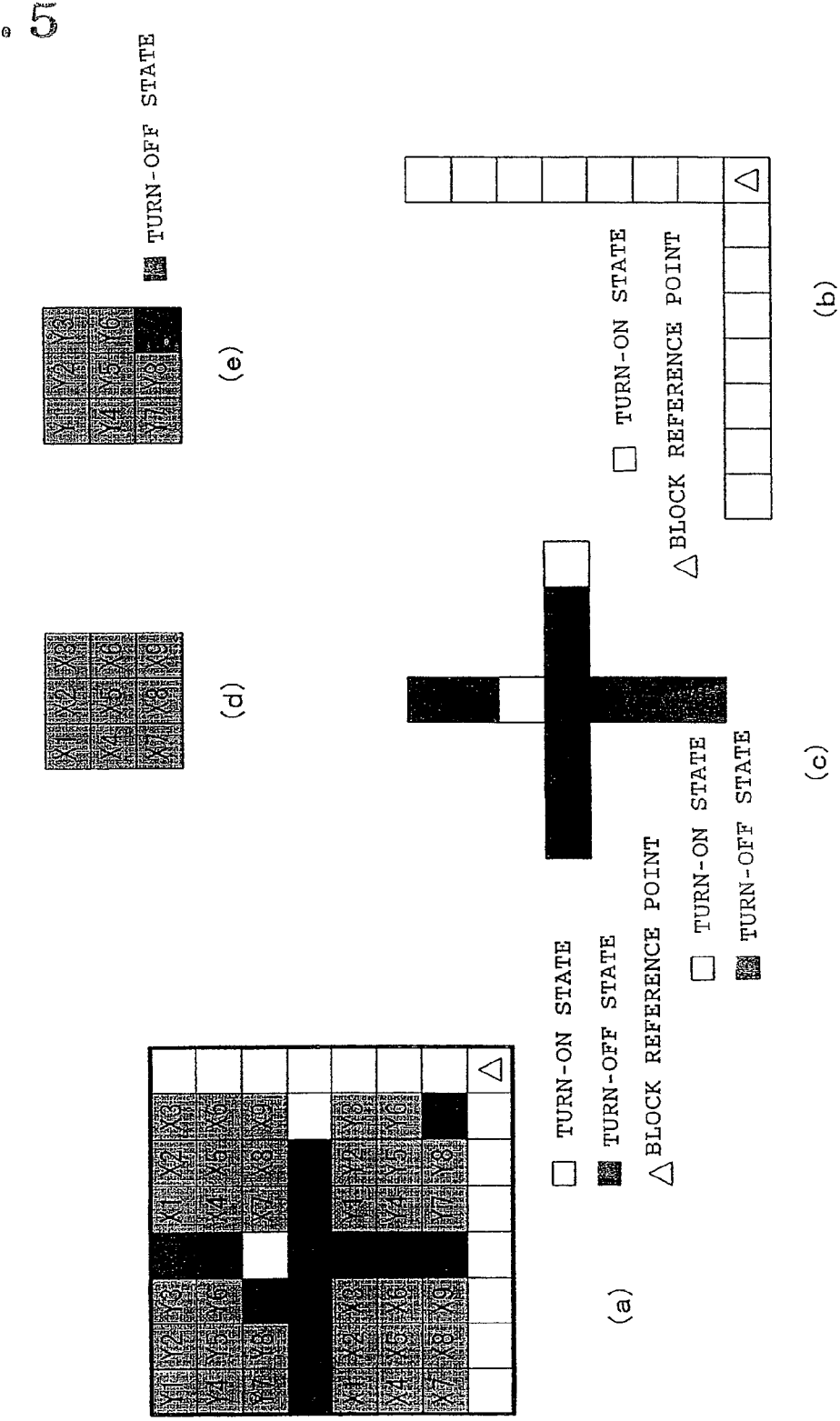
{FIG. 5} Diagram showing an example of a coordinates reading unit block as a two-dimensional code pattern based on the invention.

The two-dimensional code converting circuit 7 converts the coordinates data into 64 pixel data segments every coordinates reading unit block constructed by a block of (8×8) pixels as shown in FIG. 5(*a*) as a two-dimensional code, respectively. The coordinates reading unit block becomes one unit at the time of showing the coordinate position on the display screen of the PDP 100 and is constructed by a combination of a boundary pattern as shown in FIG. 5(*b*), a rotation detection pattern as shown in FIG. 5(*c*), an X coordinate pattern as shown in FIG. 5(*d*), and a Y coordinate pattern as shown in FIG. 5(*e*). In the boundary pattern, as shown in FIG. 5(*b*), all of a pixel group of one row (8 pixels) at the bottom end and a pixel group of one column (8 pixels) at the rightmost end of the block of (8×8) pixels are set into the turn-on state. In this instance, the pixel shown by a triangular mark locating at a cross point of the pixel group at the bottom end and the pixel group at the rightmost end becomes the block reference point. In the rotation detection pattern, each of the pixel cells of one row (7 pixel cells) and the pixel cells of one column (7 pixel cells) which are arranged crosswise is set into the turn-on state or the turn-off state in a form as shown in FIG. 5(c). In the X coordinate pattern, each pixel in the pixel block of 3 rows×3 columns as shown in FIG. 5(d) is set into a state (turn-on state or turn-off state) according to each of the bits X1 to X9 showing the coordinate positions in the X direction based on the coordinates data. In the Y coordinate pattern, each pixel in the pixel block of 3 rows×3 columns as shown in FIG. 5(e) is set into a state (turn-on state or turn-off state) according to each of the bits Y1 to Y8 showing the coordinate positions in the Y direction based on the coordinates data. That is, as shown in FIG. 5(a), the coordinates reading unit block is formed by combining the rotation detection pattern to the boundary pattern, respectively arranging the X coordinate patterns showing the same X coordinates into the first quadrant region and the third quadrant region which are formed by the rotation detection pattern, and respectively arranging the Y coordinate patterns showing the same Y coordinates into the second quadrant region and the fourth quadrant region.

In correspondence to each of the 64 pixels in the coordinates reading unit block, the two-dimensional code converting circuit 7 forms pixel drive data GD0 showing, for example, a logic level 1 for the pixel which is set into the turn-on state and a logic level 0 for the pixel which is set into the turn-off state and supplies to the address driver 5.

Figure 6:
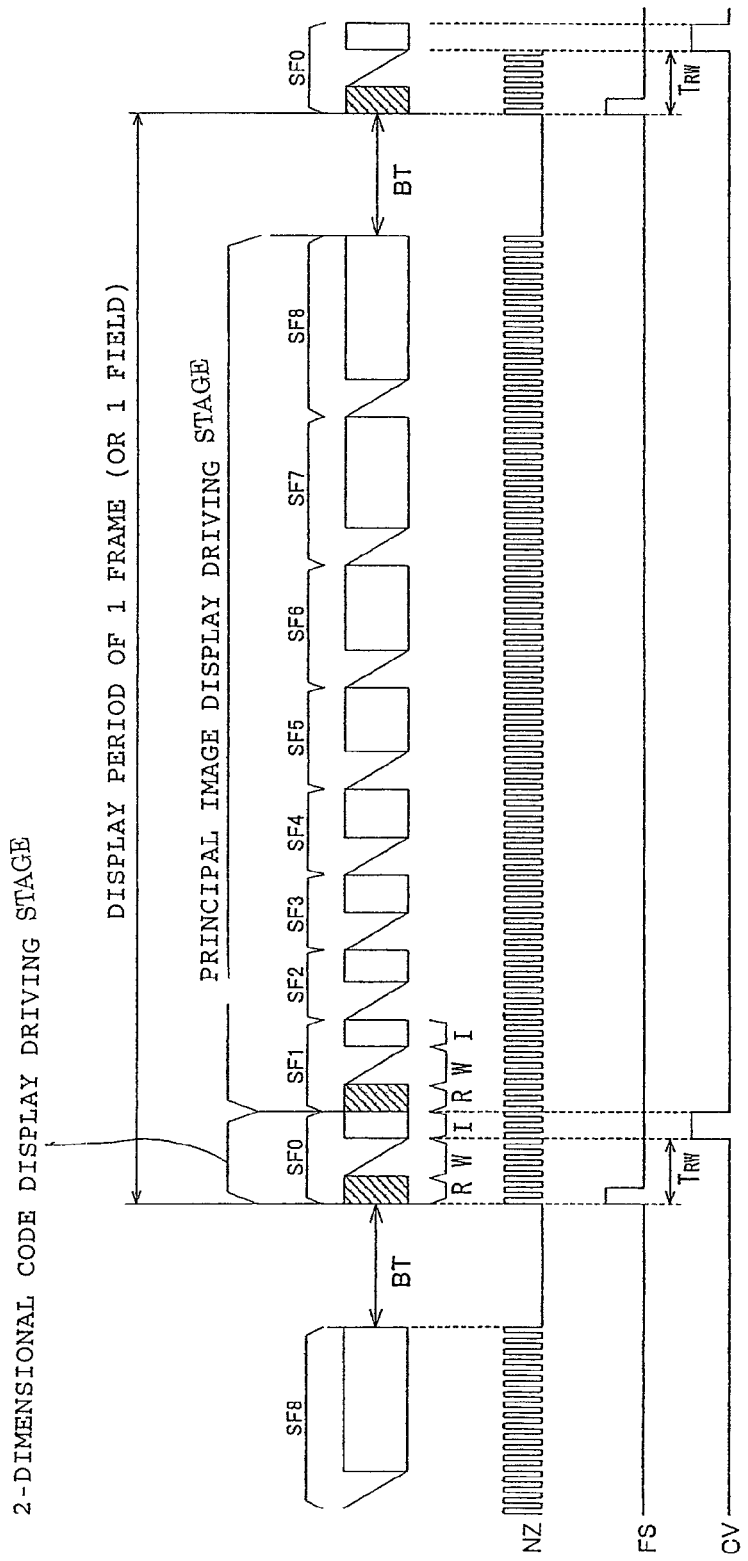
{FIG. 6} Diagram showing an example of a light emission driving sequence at the time of driving the PDP 100.

The drive control circuit 4 sequentially executes a two-dimensional code display driving stage and a principal image display driving stage within a display period of time of one frame (or one field) in accordance with a light emission driving sequence as shown in FIG. 6 based on a subfield method. In this process, in the principal image display driving stage, the drive control circuit 4 sequentially executes an addressing stage W and a sustaining stage I in each of the eight subfields SF1 to SF8 as shown in FIG. 6. Only with respect to the subfield SF1, the drive control circuit 4 executes a resetting stage R prior to the addressing stage W. In the two-dimensional code display driving stage, the drive control circuit 4 sequentially executes the resetting stage R, addressing stage W, and sustaining stage I in a subfield SF0 as shown in FIG. 6. A blanking period BT having a predetermined period length is provided after the principal image display driving stage.

By executing each of the resetting stage R, addressing stage W, and sustaining stage I, the drive control circuit 4 generates various kinds of control signals adapted to drive the PDP 100 as will be explained hereinafter and supplies to each of the address driver 5 and a row electrode driver 8.

In this process, in accordance with the execution of the resetting stage R, the row electrode driver 8 applies a reset pulse adapted to initialize the states of all pixel cells P of the PDP 100 to the state of the turn-on mode to all electrodes of the PDP 100.

In accordance with the execution of the addressing stage W, the address driver 5 subsequently generates a pixel data pulse having a voltage according to the pixel drive data GD corresponding to the subfield SF to which the addressing stage W belongs. That is, for example, in the addressing stage W of the subfield SF1, the address driver 5 generates the pixel data pulse according to the pixel drive data GD1, and in the addressing stage W of the subfield SF2, it generates the pixel data pulse according to the pixel drive data GD2. In this instance, for example, when the pixel drive data GD showing that the pixel cell P is set into the state of the turn-on mode is supplied, the address driver 5 generates the pixel data pulse of a high voltage. When the pixel drive data GD showing that the pixel cell P is set into the state of the turn-off mode is supplied, it generates the pixel data pulse of a low voltage.

For the period of time, the row electrode driver 8 sequentially applies a scanning pulse to each of the row electrodes of the PDP 100 synchronously with the timing for applying a pixel data pulse group of every display line. By the operation, each of the pixel cells P of one display line belonging to the row electrodes to which the scanning pulse has been applied is set into a state (turn-on mode or turn-off mode) according to the pixel data pulse.

Subsequently, in accordance with the execution of the sustaining stage I, the row electrode driver 8 applies a sustaining pulse adapted to allow only the pixel cells P in the turn-on mode state to repetitively perform the discharge light emission to all of the row electrodes of the PDP 100 for a light emitting period of time allocated to the subfield SF to which the sustaining stage I belongs. In the embodiment shown in FIG. 6, the sustaining pulses of the minimum number for the shortest light emitting period of time have been allocated to the subfield SF0.

According to the execution of the principal image display driving step (subfields SF1 to SF8) as shown in FIG. 6, each pixel cell emits the light corresponding to the luminance level shown by the pixel data PD. According to the pixel data PD formed on the basis of the blackboard face image data $D_{BB}$ showing the blackboard face (for example, all in black), therefore, for example, an image showing the blackboard face as shown in FIG. 7(a) is displayed on the whole display screen of the PDP 100.

Figure 8:
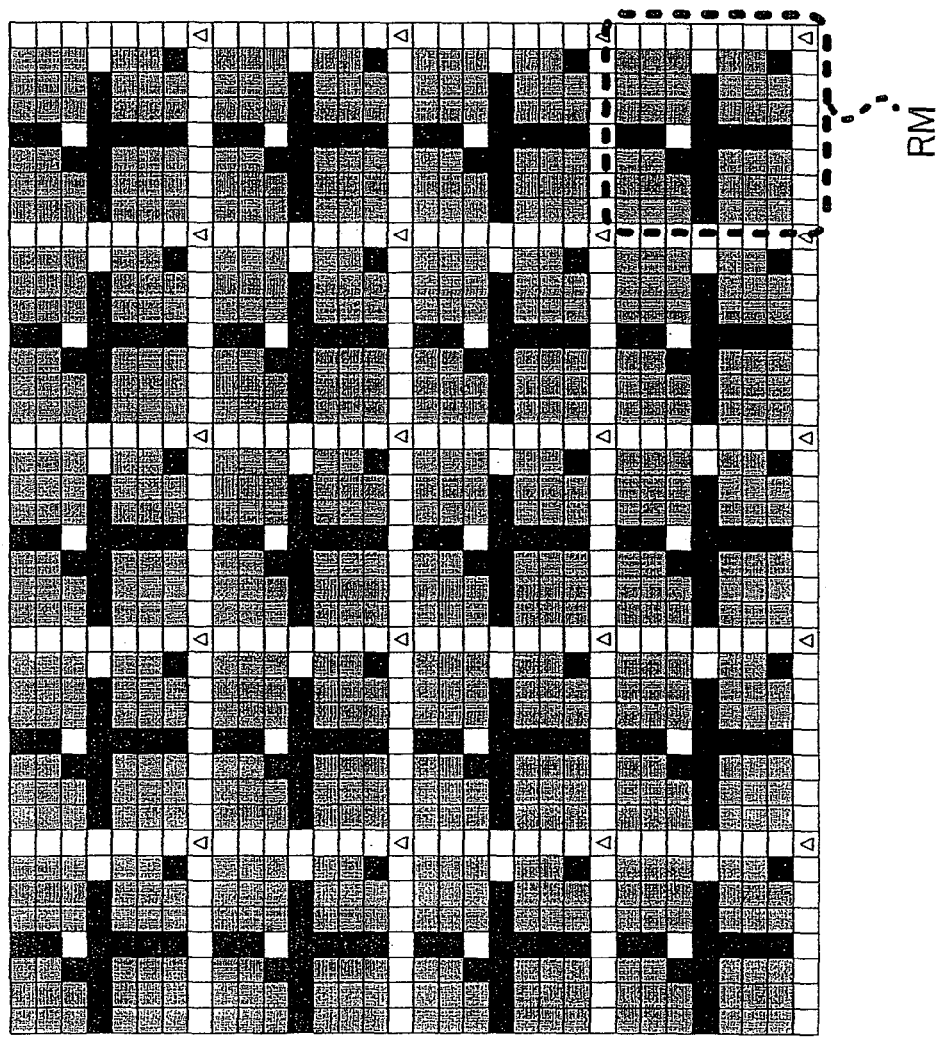
{FIG. 8} Diagram showing an example of a two-dimensional code pattern image pattern of each coordinates reading unit block which is displayed on the PDP 100.

According to the execution of the two-dimensional code display driving step (subfield SF0) as shown in FIG. 6, the light emission of each pixel cell P is executed in the sustaining stage I of the subfield SF0 in accordance with the pixel drive data GD0 based on the coordinates data. That is, the turn-on and turn-off patterns according to the two-dimensional code showing the coordinate position of each of the pixel blocks PB as shown in FIG. 4 are respectively formed at the coordinate position of each of the pixel blocks PB as shown in FIG. 8. The light emitting period of time allocated to the sustaining stage I of the subfield SF0 as mentioned above is set to such a short period of time that the turn-on and turn-off patterns based on the two-dimensional code cannot be visually perceived. The blanking period BT as shown in FIG. 6 exists just before the subfield SF0. An influence of an afterglow in the subfield SF8 at the time when the light emitted in the subfield SF0 is, thus, fetched by the following electronic chalk is eliminated.

An electronic chalk 9 extracts the turn-on and turn-off patterns based on the two-dimensional code from the photograph image signal obtained by photographing the display screen of the PDP 100 on the pixel block PB unit basis and transmits the coordinates signal showing the coordinate positions corresponding to the turn-on and turn-off patterns in a wireless manner.

Figure 9:
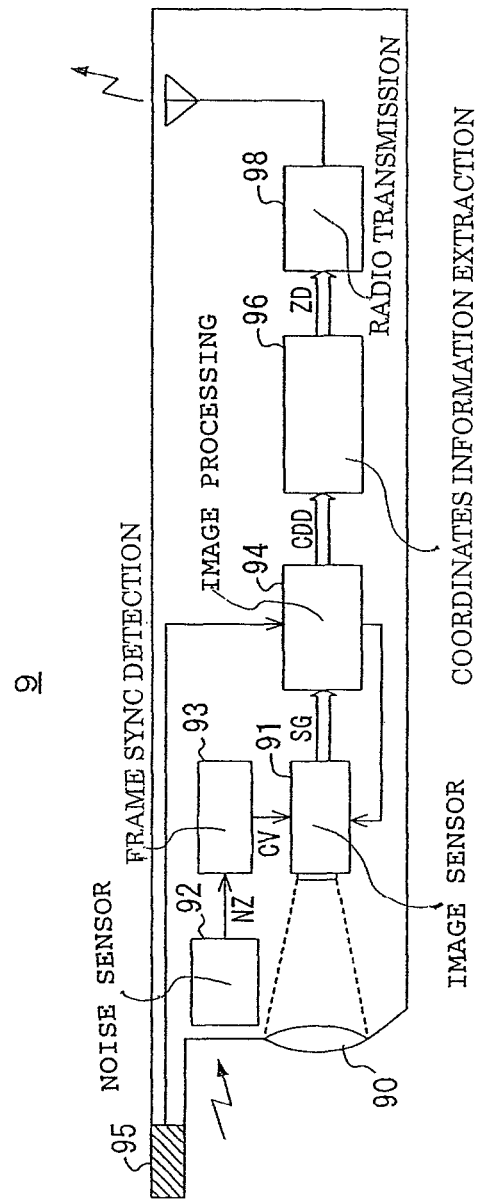
{FIG. 9} Diagram showing an internal construction of an electronic chalk 9 shown in FIG. 3.

FIG. 9 is a diagram showing an example of an internal construction of the electronic chalk 9.

In FIG. 9, an objective lens 90 collects the display light irradiated from the display screen of the PDP 100 and irradiates it onto a photosensing surface of an image sensor 91. A noise sensor 92 generates a pulse-like noise detection signal NZ which is set to the logic level 1 when noises which are generated from the display screen of the PDP 100, that is, the irradiation of infrared rays, ultraviolet rays, or electromagnetic waves in association with the discharge that is caused in each pixel cell P in the PDP 100 is detected, and supplies it to a frame sync detecting circuit 93. In this instance, since various kinds of discharges are caused during the execution period of time of the subfields SF0 to SF8 within the display period of time of one frame (or one field), each time such a discharge is caused, the pulse-like noise detection signal NZ which is set to the logic level 1 as shown in FIG. 6 is formed. Since no discharge is caused in the blanking period BT after the end of the subfield SF8, however, the noise detection signal NZ is set to the logic level 0 for the period of time as shown in FIG. 6. The frame sync detecting circuit 93 forms an image fetching signal CV which is set to the logic level 1 only during the execution period of time of the sustaining stage I of the subfield SF0 shown in FIG. 6 and is set to the logic level 0 in other periods of time in accordance with the noise detection signal NZ and supplies it to the image sensor 91.

Figure 10:
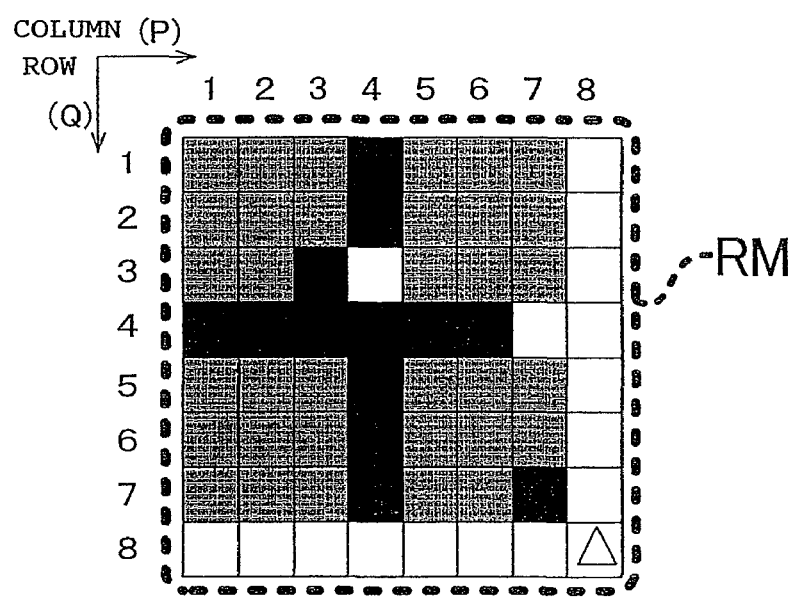
{FIG. 10} Diagram showing a correspondence relation between a photographing range RM by an image sensor 91 and the coordinates reading unit block.

The image sensor 91 has a photosensing surface onto which the display light supplied from the objective lens 90 is received every photographing range RM surrounded by broken lines as shown in FIG. 8. As shown in FIG. 8, the photographing range RM is a range where only the light irradiated from one of the pixel blocks PB each consisting of the 8×8 pixel cells can be read. The image sensor 91 fetches the display light received by the photosensing surface only for a time interval during which the image fetching signal CV of the logic level 1 as shown in FIG. 6 is supplied and supplies the image signal corresponding to the display light as a photograph image signal SG to an image processing circuit 94. That is, the image sensor 91 supplies the photograph image signal SG corresponding to the turn-on and turn-off patterns displayed by the execution of the two-dimensional code display driving step (subfield SF0), that is, the two-dimensional code pattern showing the coordinate position of the pixel block PB to the image processing circuit 94. A pen pressure sensor 95 provided in a tip portion of the electronic chalk 9 forms a drawing execution signal showing that an image is being drawn onto the blackboard face for a time interval during which the tip portion is pressed onto the display screen of the PDP 100 and supplies it to the image processing circuit 94. Only for a time interval during which the drawing execution signal is supplied, the image processing circuit 94 fetches the photograph image signal SG supplied from the image sensor 91. The image processing circuit 94 samples only the signal level obtained at a light emission center point of gravity of each pixel cell P from the photograph image signal SG and supplies a data series based on its sampling values as a two-dimensional code data CDD to a coordinates information extracting circuit 96. At this time, the image processing circuit 94 detects the light emission center point of gravity on the basis of a boundary pattern (which will be explained hereinafter) expressed by the photograph image signal SG. By the sampling operation as mentioned above, the image processing circuit 94 forms the two-dimensional code data CDD constructed by the data series based on the 64 samples corresponding to the 64 pixel positions of 8 rows×8 columns in the photographing range RM as shown in FIG. 10 and supplies it to the coordinates information extracting circuit 96. Further, when a luminance level shown by the photograph image signal SG is deviated to the luminance side higher than a predetermined luminance, the image processing circuit 94 determines that the natural light is strong, and supplies an offset signal adapted to suppress the luminance level to the image sensor 91. At this time, the image sensor 91 makes a contrast adjustment according to the offset signal to the photograph image signal SG.

Figure 11:
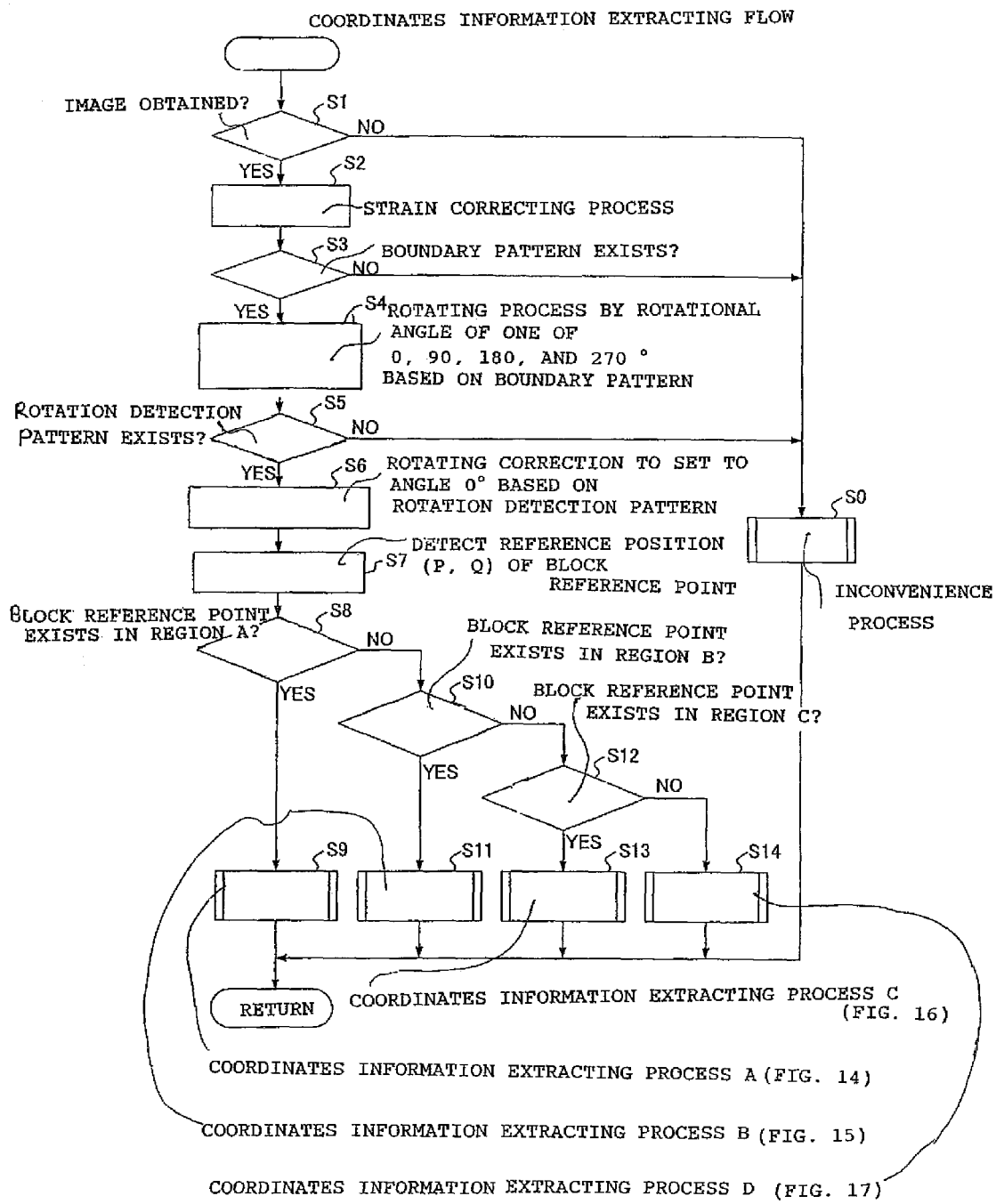
{FIG. 11} Diagram showing a coordinates information extracting flow in a coordinates information extracting circuit 96 of the electronic chalk 9.
Figure 12:
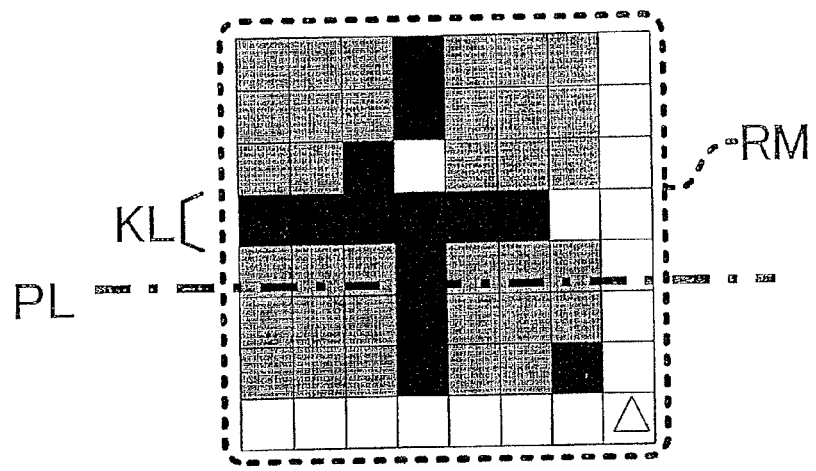
{FIG. 12} Diagram for explaining the rotation correcting operation which is executed by a coordinates rotation arithmetic operating process.

The coordinates information extracting circuit 96 executes the operation according to a coordinates information extracting flow as shown in FIG. 11 every predetermined period, thereby extracting the coordinate position information on the display screen based on the two-dimensional code data CDD and supplies it as coordinates data ZD to a radio transmitting circuit 98.

In FIG. 11, first, the coordinates information extracting circuit 96 discriminates whether or not the image based on the two-dimensional code data CDD obtained every photographing range RM as shown in FIG. 10 has been obtained (step S1). If it is determined in step S1 that the image based on the two-dimensional code data CDD has been obtained, the coordinates information extracting circuit 96 executes, for example, a strain correcting process for correcting a trapezoidal strain that is caused by an inclination use of the electronic chalk 9 to the obtained image based on the two-dimensional code data CDD (step S2). The coordinates information extracting circuit 96 subsequently discriminates whether or not all or a part of the boundary pattern as shown in FIG. 5(*b*) exists in the obtained image which has been subjected to the strain correcting process (step S3). If it is determined in step S3 that all or a part of the boundary pattern exists, the coordinates information extracting circuit 96 executes a rotating process to the obtained image in order to rotate the image so that its rotational angle is set to any one of 0°, 90°, 180°, and 270° on the basis of the boundary pattern (step S4). The coordinates information extracting circuit 96 subsequently discriminates whether or not a rotation detection pattern has been detected from the obtained image which had been subjected to the rotating process (step S5). If it is determined in step S5 that the rotation detection pattern is not detected, if it is determined in step S3 that the boundary pattern is not detected, or if it is determined in step S1 that the image is not obtained, the coordinates information extracting circuit 96 executes a predetermined inconvenience process (which will be not explained) (step S0). If it is determined in step S5 that the rotation detection pattern has been detected, the coordinates information extracting circuit 96 executes a rotation correcting process in order to rotate the obtained image to a correct angle (0°) on the basis of the rotation detection pattern (step S6). The coordinates information extracting circuit 96 subsequently detects a pixel position where the block reference point as shown by the triangular mark in FIG. 5(*b*) from each of the pixel position where the boundary pattern appears and sets it as a reference position (P, Q) (step S7). P in the reference position (P, Q) denotes a position in the column direction in the photographing range RM shown in FIG. 10 and Q denotes a position in the row direction.

Figure 13:
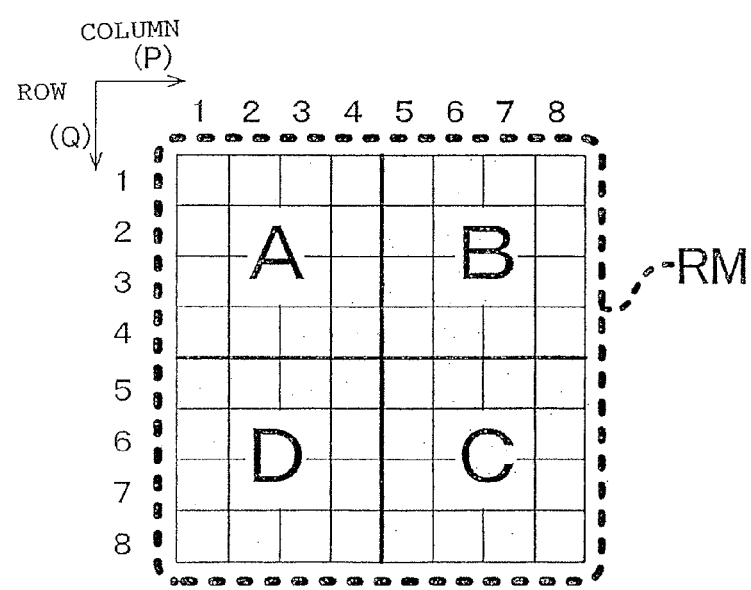
{FIG. 13} Diagram showing regions A to D in the photographing range RM by the image sensor 91.

The coordinates information extracting circuit 96 subsequently discriminates whether or not the reference position (P, Q) is included in a region A in the photographing range RM as shown in FIG. 13, that is, a region in the first to fourth rows and the first to fourth columns (step S8). If it is determined in step S8 that the reference position (P, Q) is included in the region A, the coordinates information extracting circuit 96 extracts the coordinates information from the rotation correction two-dimensional code data by a procedure shown by a coordinates information extracting process A (which will be explained hereinafter) shown in FIG. 14 and supplies the coordinates data ZD showing it to the radio transmitting circuit 98 (step S9).

If it is determined in step S8 that the reference position (P, Q) is not included in the region A, the coordinates information extracting circuit 96 discriminates whether or not the reference position (P, Q) is included in a region B in the photographing range RM as shown in FIG. 13, that is, a region in the first to fourth rows and the fifth to eighth columns (step S10). If it is determined in step S10 that the reference position (P, Q) is included in the region B, the coordinates information extracting circuit 96 extracts the coordinates information from the rotation correction two-dimensional code data by a procedure shown by a coordinates information extracting process B (which will be explained hereinafter) shown in FIG. 15 and supplies the coordinates data ZD showing it to the radio transmitting circuit 98 (step S11).

If it is determined in step S10 that the reference position (P, Q) is not included in the region B, the coordinates information extracting circuit 96 discriminates whether or not the reference position (P, Q) is included in a region C in the photographing range RM as shown in FIG. 13, that is, a region in the fifth to eighth rows and the fifth to eighth columns (step S12). If it is determined in step S12 that the reference position (P, Q) is included in the region C, the coordinates information extracting circuit 96 extracts the coordinates information from the rotation correction two-dimensional code data by a procedure shown by a coordinates information extracting process C (which will be explained hereinafter) shown in FIG. 16 and supplies the coordinates data ZD showing it to the radio transmitting circuit 98 (step S13).

If it is determined in step S12 that the reference position (P, Q) is not included in the region C, the coordinates information extracting circuit 96 determines that the reference position (P, Q) is included in a region D, that is, a region in the fifth to eighth rows and the first to fourth columns. At this time, the coordinates information extracting circuit 96 extracts the coordinates information from the rotation correction two-dimensional code data by a procedure shown by a coordinates information extracting process D (which will be explained hereinafter) shown in FIG. 17 and supplies the coordinates data ZD showing it to the radio transmitting circuit 98 (step S14).

The coordinates information extracting processes A to D which are executed in steps S9, S11, S13, and S14 will be described hereinbelow.

First, the coordinates information extracting process A which is executed in step S9 when the reference position (P, Q) is included in the region A will be described with reference to FIG. 14.

Figure 14:
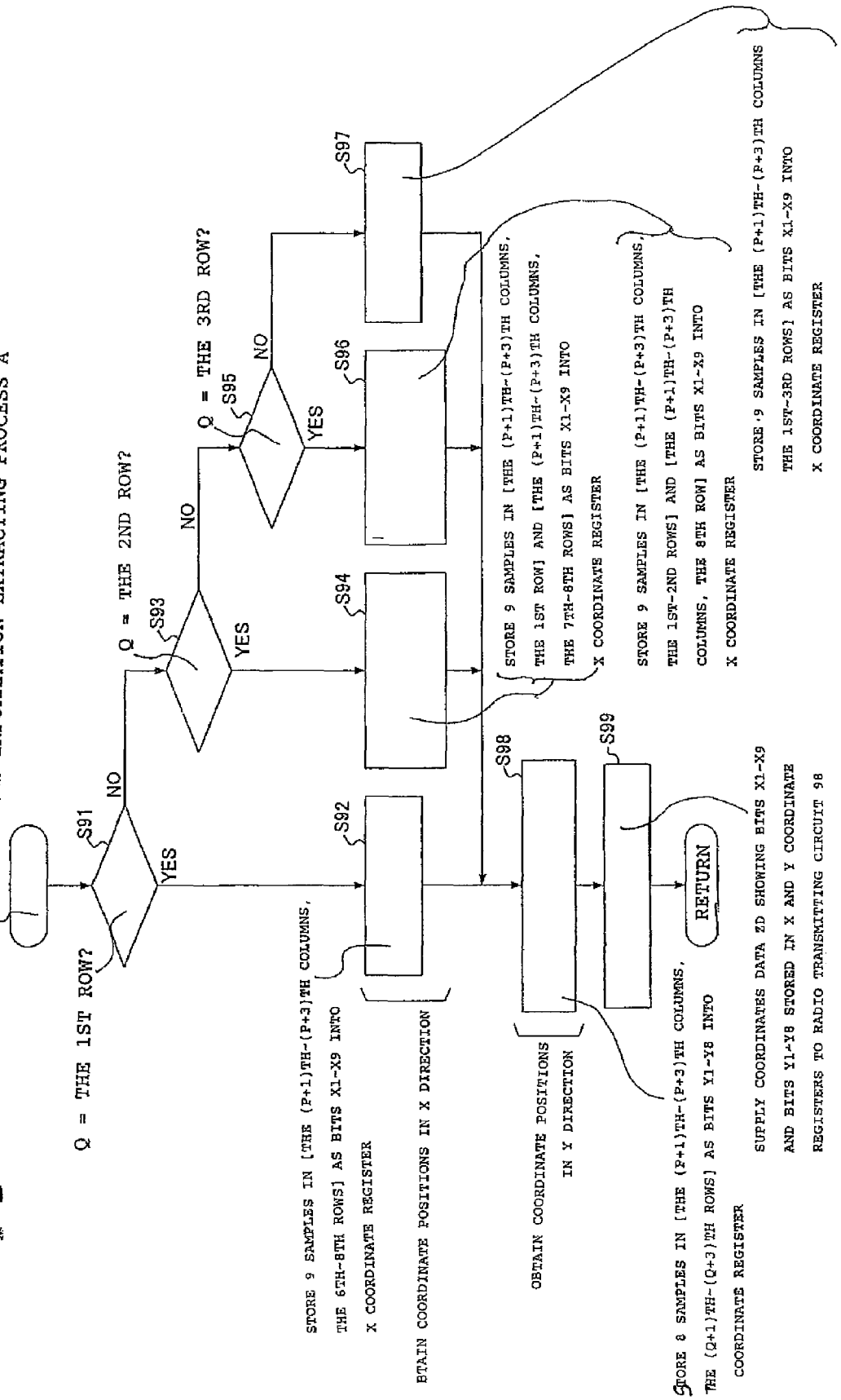
{FIG. 14} Diagram showing a subroutine flow by a coordinates information extracting process A which is executed in the case where a block reference point exists in the region A in the photographing range RM.

In FIG. 14, first, the coordinates information extracting circuit 96 discriminates whether or not Q shown in the reference position (P, Q) indicates the first row (step S91). If it is determined in step S91 that Q shown in the reference position (P, Q) indicates the first row, the coordinates information extracting circuit 96 extracts nine samples corresponding to the pixel positions existing in the range of {the (P+1)th column to the (P+3)th column, the 6th row to the 8th row} in the photographing range RM shown in FIG. 10 from the rotation correction two-dimensional code data and stores them into an X coordinate register (not shown) as bits X1 to X9 showing the coordinate positions in the X direction (step S92).

If it is determined in step S91 that Q shown in the reference position (P, Q) does not indicate the first row, the coordinates information extracting circuit 96 discriminates whether or not Q indicates the second row (step S93). If it is determined in step S93 that Q shown in the reference position (P, Q) indicates the second row, the coordinates information extracting circuit 96 extracts nine samples corresponding to the pixel positions existing in the ranges of {the (P+1)th column to the (P+3)th column, the first row} and {the (P+1)th column to the (P+3)th column, the 7th row to the 8th row} in the photographing range RM shown in FIG. 10 from the rotation correction two-dimensional code data and stores them into the X coordinate register as bits X1 to X9 showing the coordinate positions in the X direction (step S94).

If it is determined in step S93 that Q shown in the reference position (P, Q) does not indicate the second row, the coordinates information extracting circuit 96 discriminates whether or not Q indicates the third row (step S95). If it is determined in step S95 that Q shown in the reference position (P, Q) indicates the third row, the coordinates information extracting circuit 96 extracts nine samples corresponding to the pixel positions existing in the ranges of {the (P+1)th column to the (P+3)th column, the first row to the second row} and {the (P+1)th column to the (P+3)th column, the 8th row} in the photographing range RM shown in FIG. 10 from the rotation correction two-dimensional code data and stores them into the X coordinate register as bits X1 to X9 showing the coordinate positions in the X direction (step S96).

If it is determined in step S95 that Q shown in the reference position (P, Q) does not indicate the third row, the coordinates information extracting circuit 96 decides that Q indicates the fourth row. In this instance, the coordinates information extracting circuit 96 extracts nine samples corresponding to the pixel positions existing in the range of {the (P+1)th column to the (P+3)th column, the first row to the third row} in the photographing range RM shown in FIG. 10 from the rotation correction two-dimensional code data and stores them into the X coordinate register as bits X1 to X9 showing the coordinate positions in the X direction (step S97).

After completion of step S92, S94, S96, or S97, the coordinates information extracting circuit 96 extracts eight samples corresponding to the pixel positions existing in the range of {the (P+1)th column to the (P+3)th column, the (Q+1)th row to the (Q+3)th row} in the photographing range RM shown in FIG. 10 from the rotation correction two-dimensional code data and stores them into a Y coordinate register (not shown) as bits Y1 to Y8 showing the coordinate positions in the Y direction (step S98). The coordinates information extracting circuit 96 supplies the coordinates data ZD in which the bits X1 to X9 stored in the X coordinate register are shown as the coordinate positions in the X direction (lateral direction) on the display screen of the PDP 100 and the bits Y1 to Y8 stored in the Y coordinate register are shown as the coordinate positions in the Y direction (vertical direction) on the display screen of the PDP 100 to the radio transmitting circuit 98 (step S99).

Subsequently, the coordinates information extracting process B which is executed in step S11 when the reference position (P, Q) is included in the region B will be described with reference to FIG. 15.

Figure 15:
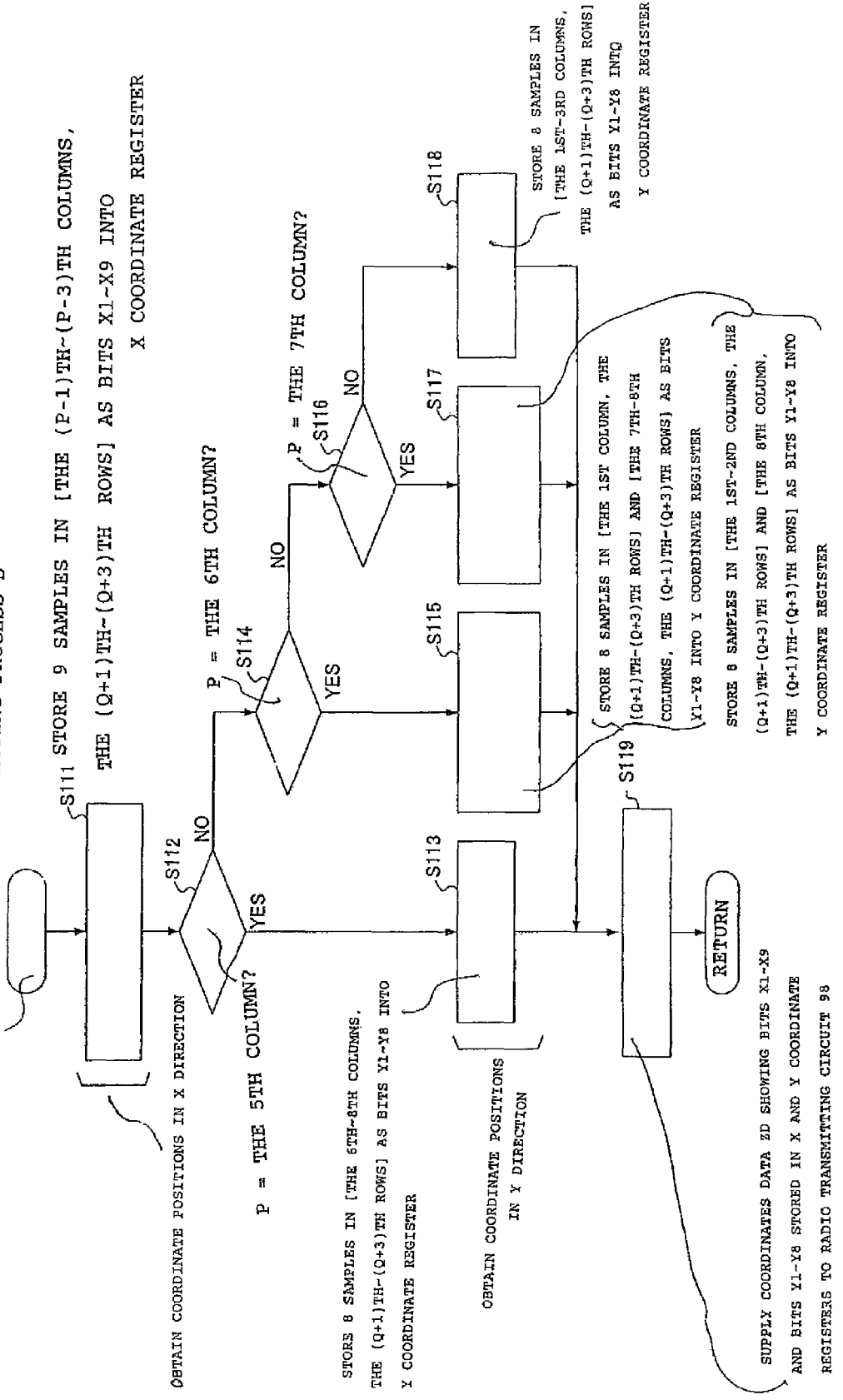
{FIG. 15} Diagram showing a subroutine flow by a coordinates information extracting process B which is executed in the case where the block reference point exists in the region B in the photographing range RM.

In FIG. 15, first, the coordinates information extracting circuit 96 extracts nine samples corresponding to the pixel positions existing in the range of {the (P−3)th column to the (P−1)th column, the (Q+1)th row to the (Q+3)th row} in the photographing range RM shown in FIG. 10 from the rotation correction two-dimensional code data and stores them into the X coordinate register as bits X1 to X9 showing the coordinate positions in the X direction (step S111).

Subsequently, the coordinates information extracting circuit 96 discriminates whether or not P shown in the reference position (P, Q) indicates the fifth column (step S112). If it is determined in step S112 that P shown in the reference position (P, Q) indicates the fifth column, the coordinates information extracting circuit 96 extracts eight samples corresponding to the pixel positions existing in the range of {the 6th column to the 8th column, the (Q+1)th row to the (Q+3)th row} in the photographing range RM shown in FIG. 10 from the rotation correction two-dimensional code data and stores them into the Y coordinate register as bits Y1 to Y8 showing the coordinate positions in the Y direction (step S113).

If it is determined in step S112 that P shown in the reference position (P, Q) does not indicate the fifth column, the coordinates information extracting circuit 96 discriminates whether or not P indicates the sixth column (step S114). If it is determined in step S114 that P shown in the reference position (P, Q) indicates the sixth column, the coordinates information extracting circuit 96 extracts eight samples corresponding to the pixel positions existing in the ranges of {the first column, the (Q+1)th row to the (Q+3)th row} and
{the 7th column to the 8th column, the (Q+1)th row to the (Q+3)th row} in the photographing range RM shown in FIG. 10 from the rotation correction two-dimensional code data and stores them into the Y coordinate register as bits Y1 to Y8 showing the coordinate positions in the Y direction (step S115).

If it is determined in step S114 that P shown in the reference position (P, Q) does not indicate the sixth column, the coordinates information extracting circuit 96 discriminates whether or not P indicates the seventh column (step S116). If it is determined in step S116 that P shown in the reference position (P, Q) indicates the seventh column, the coordinates information extracting circuit 96 extracts eight samples corresponding to the pixel positions existing in the ranges of {the first column to the second column, the (Q+1)th row to the (Q+3)th row} and
{the 8th column, the (Q+1)th row to the (Q+3)th row} in the photographing range RM shown in FIG. 10 from the rotation correction two-dimensional code data and stores them into the Y coordinate register as bits Y1 to Y8 showing the coordinate positions in the Y direction (step S117).

If it is determined in step S116 that P shown in the reference position (P, Q) does not indicate the seventh column, the coordinates information extracting circuit 96 decides that P indicates the eighth column. At this time, the coordinates information extracting circuit 96 extracts eight samples corresponding to the pixel positions existing in the range of {the first column to the third column, the (Q+1)th row to the (Q+3)th row} in the photographing range RM shown in FIG. 10 from the rotation correction two-dimensional code data and stores them into the Y coordinate register as bits Y1 to Y8 showing the coordinate positions in the Y direction (step S118).

After the execution of step S113, S115, S117, or S118, the coordinates information extracting circuit 96 supplies the coordinates data ZD in which the bits X1 to X9 stored in the X coordinate register are shown as the coordinate positions in the X direction (lateral direction) on the display screen of the PDP 100 and the bits Y1 to Y8 stored in the Y coordinate register are shown as the coordinate positions in the Y direction (vertical direction) on the display screen of the PDP 100 to the radio transmitting circuit 98 (step S119).

Subsequently, the coordinates information extracting process C which is executed in step S13 when the reference position (P, Q) is included in the region C will be described with reference to FIG. 16.

Figure 16:
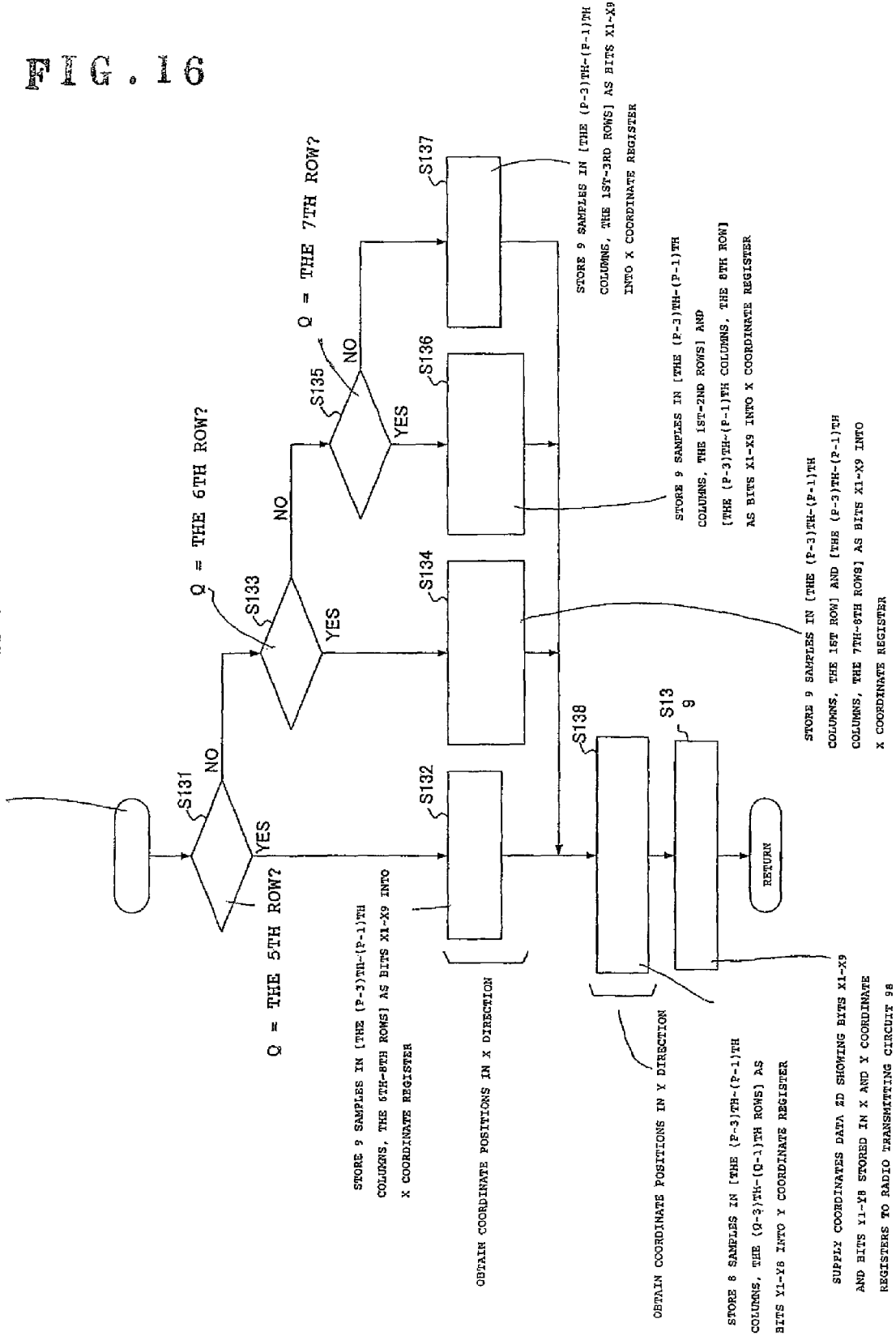
{FIG. 16} Diagram showing a subroutine flow by a coordinates information extracting process C which is executed in the case where the block reference point exists in the region C in the photographing range RM.

In FIG. 16, first, the coordinates information extracting circuit 96 discriminates whether or not Q shown in the reference position (P, Q) indicates the fifth row (step S131). If it is determined in step S131 that Q shown in the reference position (P, Q) indicates the fifth row, the coordinates information extracting circuit 96 extracts nine samples corresponding to the pixel positions existing in the range of {the (P−3)th column to the (P−1)th column, the 6th row to the 8th row} in the photographing range RM shown in FIG. 10 from the rotation correction two-dimensional code data and stores them into an X coordinate register as bits X1 to X9 showing the coordinate positions in the X direction (step S132).

If it is determined in step S131 that Q shown in the reference position (P, Q) does not indicate the fifth row, the coordinates information extracting circuit 96 discriminates whether or not Q indicates the sixth row (step S133). If it is determined in step S133 that Q shown in the reference position (P, Q) indicates the sixth row, the coordinates information extracting circuit 96 extracts nine samples corresponding to the pixel positions existing in the ranges of {the (P−3)th column to the (P−1)th column, the first row} and
{the (P−3)th column to the (P−1)th column, the 7th row to the 8th row} in the photographing range RM shown in FIG. 10 from the rotation correction two-dimensional code data and stores them into the X coordinate register as bits X1 to X9 showing the coordinate positions in the X direction (step S134).

If it is determined in step S133 that Q shown in the reference position (P, Q) does not indicate the sixth row, the coordinates information extracting circuit 96 discriminates whether or not Q indicates the seventh row (step S135). If it is determined in step S135 that Q shown in the reference position (P, Q) indicates the seventh row, the coordinates information extracting circuit 96 extracts nine samples corresponding to the pixel positions existing in the ranges of {the (P−3)th column to the (P−1)th column, the first row to the second row} and
{the (P−3)th column to the (P−1)th column, the 8th row} in the photographing range RM shown in FIG. 10 from the rotation correction two-dimensional code data and stores them into the X coordinate register as bits X1 to X9 showing the coordinate positions in the X direction (step S136).

If it is determined in step S135 that Q shown in the reference position (P, Q) does not indicate the seventh row, the coordinates information extracting circuit 96 decides that Q indicates the eighth row. In this instance, the coordinates information extracting circuit 96 extracts nine samples corresponding to the pixel positions existing in the range of {the (P−3)th column to the (P−1)th column, the first row to the third row} in the photographing range RM shown in FIG. 10 from the rotation correction two-dimensional code data and stores them into the X coordinate register as bits X1 to X9 showing the coordinate positions in the X direction (step S137).

After completion of step S132, S134, S136, or S137, the coordinates information extracting circuit 96 extracts eight samples corresponding to the pixel positions existing in the range of {the (P−3)th column to the (P−1)th column, the (Q−3)th row to the (Q−1)th row} in the photographing range RM shown in FIG. 10 from the rotation correction two-dimensional code data and stores them into the Y coordinate register as bits Y1 to Y8 showing the coordinate positions in the Y direction (step S138). The coordinates information extracting circuit 96 supplies the coordinates data ZD in which the bits X1 to X9 stored in the X coordinate register are shown as the coordinate positions in the X direction (lateral direction) on the display screen of the PDP 100 and the bits Y1 to Y8 stored in the Y coordinate register are shown as the coordinate positions in the Y direction (vertical direction) on the display screen of the PDP 100 to the radio transmitting circuit 98 (step S139).

Subsequently, the coordinates information extracting process D which is executed in step S14 when the reference position (P, Q) is included in the region D will be described with reference to FIG. 17.

Figure 17:
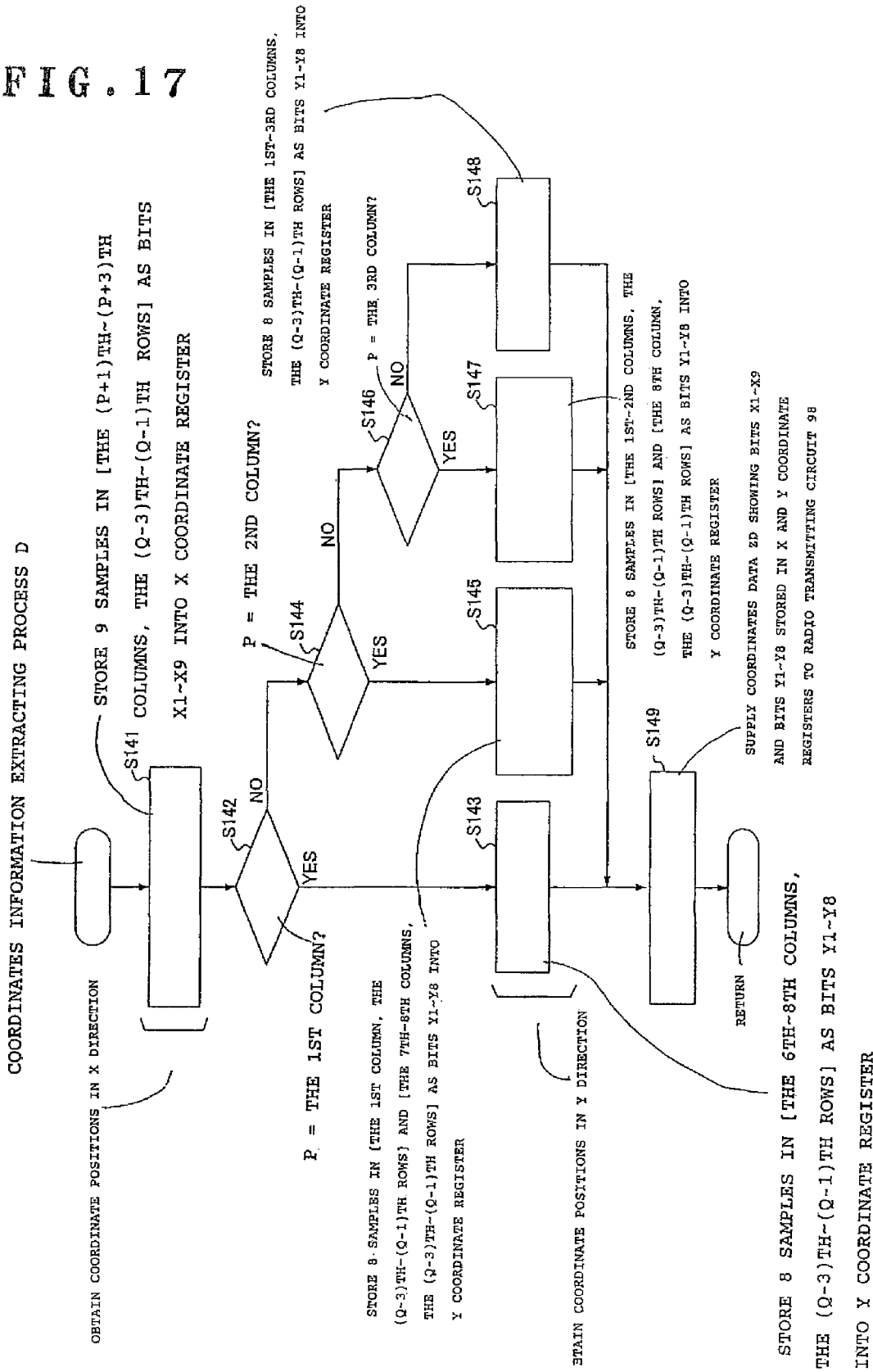
{FIG. 17} Diagram showing a subroutine flow by a coordinates information extracting process D which is executed in the case where the block reference point exists in the region D in the photographing range RM.

In FIG. 17, first, the coordinates information extracting circuit 96 extracts nine samples corresponding to the pixel positions existing in the range of
{the (P+1)th column to the (P+3)th column, the (Q−3)th row to the (Q−1)th row}
in the photographing range RM shown in FIG. 10 from the rotation correction two-dimensional code data and stores them into the X coordinate register as bits X1 to X9 showing the coordinate positions in the X direction (step S141).

Subsequently, the coordinates information extracting circuit 96 discriminates whether or not P shown in the reference position (P, Q) indicates the first column (step S142). If it is determined in step S142 that P shown in the reference position (P, Q) indicates the first column, the coordinates information extracting circuit 96 extracts eight samples corresponding to the pixel positions existing in the range of
{the 6th column to the 8th column, the (Q−3)th row to the (Q−1)th row}
in the photographing range RM shown in FIG. 10 from the rotation correction two-dimensional code data and stores them into the Y coordinate register as bits Y1 to Y8 showing the coordinate positions in the Y direction (step S143).

If it is determined in step S142 that P shown in the reference position (P, Q) does not indicate the first column, the coordinates information extracting circuit 96 discriminates whether or not P indicates the second column (step S144). If it is determined in step S144 that P shown in the reference position (P, Q) indicates the second column, the coordinates information extracting circuit 96 extracts eight samples corresponding to the pixel positions existing in the ranges of
{the first column, the (Q−3)th row to the (Q−1)th row} and
{the 7th column to the 8th column, the (Q−3)th row to the (Q−1)th row}
in the photographing range RM shown in FIG. 10 from the rotation correction two-dimensional code data and stores them into the Y coordinate register as bits Y1 to Y8 showing the coordinate positions in the Y direction (step S145).

If it is determined in step S144 that P shown in the reference position (P, Q) does not indicate the second column, the coordinates information extracting circuit 96 discriminates whether or not P indicates the third column (step S146) If it is determined in step S146 that P shown in the reference position (P, Q) indicates the third column, the coordinates information extracting circuit 96 extracts eight samples corresponding to the pixel positions existing in the ranges of
{the first column to the second column, the (Q−3)th row to the (Q−1)th row} and
{the 8th column, the (Q−3)th row to the (Q−1)th row}
in the photographing range RM shown in FIG. 10 from the rotation correction two-dimensional code data and stores them into the Y coordinate register as bits Y1 to Y8 showing the coordinate positions in the Y direction (step S147).

If it is determined in step S146 that P shown in the reference position (P, Q) does not indicate the third column, the coordinates information extracting circuit 96 decides that P indicates the fourth column. At this time, the coordinates information extracting circuit 96 extracts eight samples corresponding to the pixel positions existing in the range of
{the first column to the third column, the (Q−3)th row to the (Q−1)th row}
in the photographing range RM shown in FIG. 10 from the rotation correction two-dimensional code data and stores them into the Y coordinate register as bits Y1 to Y8 showing the coordinate positions in the Y direction (step S148).

After the execution of step S143, S145, S147, or S148, the coordinates information extracting circuit 96 supplies the coordinates data ZD in which the bits X1 to X9 stored in the X coordinate register are shown as the coordinate positions in the X direction (lateral direction) on the display screen of the PDP 100 and the bits Y1 to Y8 stored in the Y coordinate register are shown as the coordinate positions in the Y direction (vertical direction) on the display screen of the PDP 100 to the radio transmitting circuit 98 (step S149).

An example of the coordinates information extracting operation which is executed by the operations shown in FIGS. 11 and 14 to 17 will be described hereinbelow.

Figure 18:
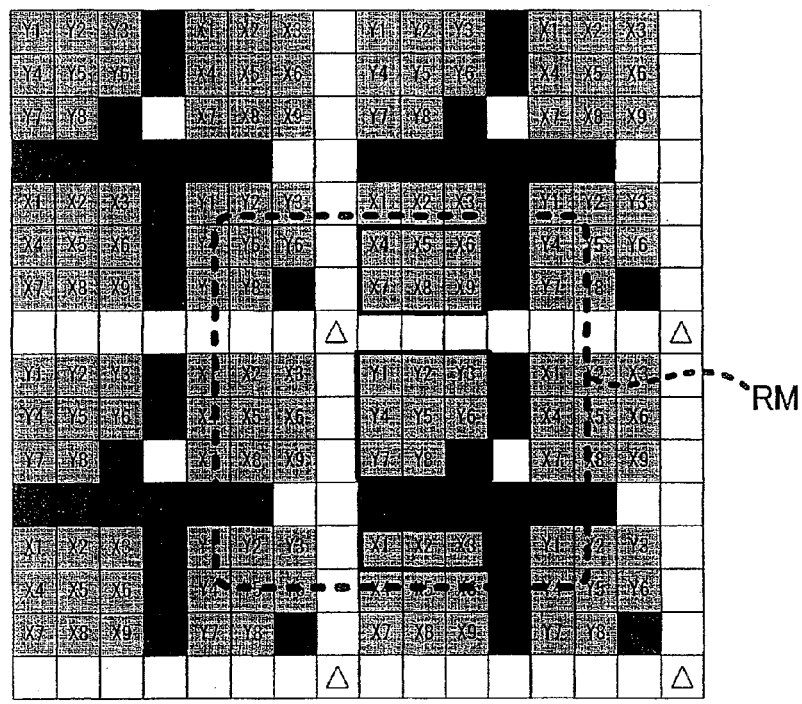
{FIG. 18} Diagram showing an example of a form in the case where the block reference point of the coordinates reading unit block exists in the region A in the photographing range RM.

First, the operation in the case where when the user makes the electronic chalk 9 come into contact with the display screen of the PDP 100, the photographing range RM by the image sensor 91 of the electronic chalk 9 enters a state as shown in FIG. 18 will be described. In this instance, the reference position (P, Q) of the block reference point (shown by a triangular mark) in the boundary pattern is equal to (3, 3) and exists in the region A in the photographing range RM. The coordinates information extracting process A as shown in FIG. 14 is, therefore, executed and the coordinate positions in the X direction are extracted by step S96 and the coordinate positions in the Y direction are extracted by step S98 from the rotation correction two-dimensional code data corresponding to the photographing range RM, respectively. That is, the bits X1 to X9 existing in ranges (ranges surrounded by bold lines) of
{the (3+1)th column to the (3+3)th column, the first row to the second row} and
{the (3+1)th column to the (3+3)th column, the 8th row}
in the photographing range RM surrounded by broken lines in FIG. 18 are extracted from the rotation correction two-dimensional code data and they are stored into the X coordinate register as bits X1 to X9 showing the coordinate positions in the X direction.

The bits Y1 to Y8 existing in a range (range surrounded by bold lines) of
{the (3+1)th column to the (3+3)th column, the (3+1)th row to the (3+3)th row}
are extracted from the rotation correction two-dimensional code data and they are stored into the Y coordinate register as bits Y1 to Y8 showing the coordinate positions in the Y direction.

Figure 19:
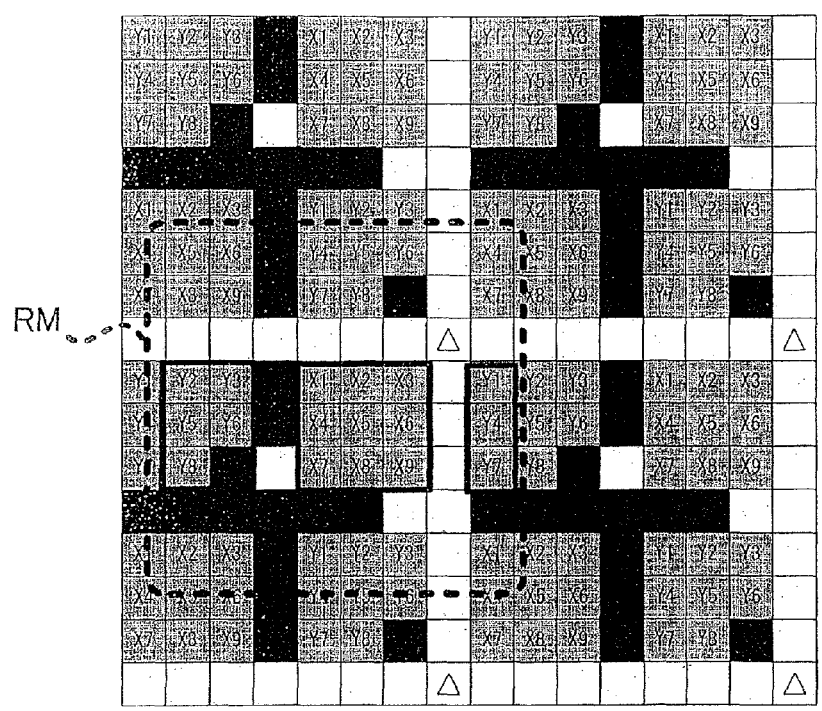
{FIG. 19} Diagram showing an example of a form in the case where the block reference point of the coordinates reading unit block exists in the region B in the photographing range RM.

Subsequently, the operation in the case where when the user makes the electronic chalk 9 come into contact with the display screen of the PDP 100, the photographing range RM by the image sensor 91 of the electronic chalk 9 enters a state as shown in FIG. 19 will be described. In this instance, the reference position (P, Q) of the block reference point (shown by a triangular mark) in the boundary pattern is equal to (7, 3) and exists in the region B in the photographing range RM. The coordinates information extracting process B as shown in FIG. 15 is, therefore, executed and the coordinate positions in the X direction are extracted by step S111 and the coordinate positions in the Y direction are extracted by step S117 from the rotation correction two-dimensional code data corresponding to the photographing range RM, respectively. That is, the bits X1 to X9 existing in a range (range surrounded by bold lines) of {the (7−3)th column to the (7−1)th column, the (3+1)th row to the (3+3)th row} in the photographing range RM surrounded by broken lines in FIG. 19 are extracted from the rotation correction two-dimensional code data and they are stored into the X coordinate register as bits X1 to X9 showing the coordinate positions in the X direction.

The bits Y1 to Y8 existing in ranges (ranges surrounded by bold lines) of

{the first column to the second column, the (3+1)th row to the (3+3)th row} and

{the 8th column, the (3+1)th row to the (3+3)th row} are extracted from the rotation correction two-dimensional code data and they are stored into the Y coordinate register as bits Y1 to Y8 showing the coordinate positions in the Y direction.

Figure 20:
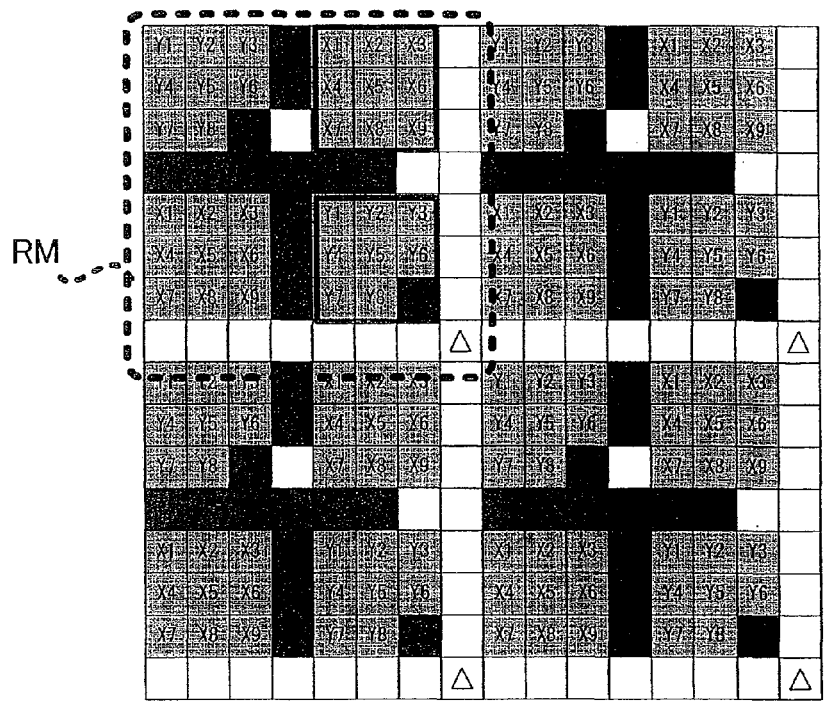
{FIG. 20} Diagram showing an example of a form in the case where the block reference point of the coordinates reading unit block exists in the region C in the photographing range RM.

Subsequently, the operation in the case where when the user makes the electronic chalk 9 come into contact with the display screen of the PDP 100, the photographing range RM by the image sensor 91 of the electronic chalk 9 enters a state as shown in FIG. 20 will be described. In this instance, the reference position (P, Q) of the block reference point (shown by a triangular mark) in the boundary pattern is equal to (8, 8) and exists in the region C in the photographing range RM. The coordinates information extracting process C as shown in FIG. 16 is, therefore, executed and the coordinate positions in the X direction are extracted by step S137 and the coordinate positions in the Y direction are extracted by step S138 from the rotation correction two-dimensional code data corresponding to the photographing range RM, respectively. That is, the bits X1 to X9 existing in a range (range surrounded by bold lines) of {the (8−3)th column to the (8−1)th column, the first row to the third row} in the photographing range RM surrounded by broken lines in FIG. 20 are extracted from the rotation correction two-dimensional code data and they are stored into the X coordinate register as bits X1 to X9 showing the coordinate position in the X direction.

The bits Y1 to Y8 existing in a range (range surrounded by bold lines) of

{the (8−3)th column to the (8−1)th column, the (8−3)th row to the (8−1)th row} are extracted from the rotation correction two-dimensional code data and they are stored into the Y coordinate register as bits Y1 to Y8 showing the coordinate positions in the Y direction.

The coordinates information extracting circuit 96 supplies the coordinates data ZD in which the bits X1 to X9 stored in the X coordinate register are shown as the coordinate positions in the horizontal direction (lateral direction) on the display screen and the bits Y1 to Y8 stored in the Y coordinate register are shown as the coordinate positions in the vertical direction (longitudinal direction) to the radio transmitting circuit 98. The radio transmitting circuit 98 executes a modulating process to the coordinates data ZD supplied from the coordinates information extracting circuit 96 and transmits it in a wireless manner.

A receiving circuit 10 shown in FIG. 3 receives the transmission wave from the electronic chalk 9, reconstructs the coordinates data ZD by demodulating it, and supplies to an image data forming circuit 11. The image data forming circuit 11 forms image data showing a straight line or a curve which traces sequentially each of the coordinate positions shown by the coordinates data ZD which is sequentially supplied from the receiving circuit 10, and supplies it as a display image data signal $D_{TR}$ to the image superimposing circuit 2. In accordance with the pixel data PD obtained by superimposing the display image data signal $D_{TR}$ to the blackboard face image data $D_{BB}$, thus, the driving along the principal image display driving step constructed by the subfields SF1 to SF8 as shown in FIG. 6 is executed. At this time, when the tip portion of the electronic chalk 9 is moved while making the tip portion come into contact with the display screen of the PDP 100, an image of a straight line or a curve along its moving locus is superimposed and displayed into the blackboard face image shown by the blackboard face image data $D_{BB}$ as shown in FIG. 7(b).

As mentioned above, the two-dimensional code patterns in each of which the image patterns (bits X1 to X9) showing the coordinate positions in the X direction of the coordinates reading unit block are included in each of the first and third quadrant regions and the image patterns (bits Y1 to Y8) showing the coordinate positions in the Y direction are included in each of the second and fourth quadrant regions in each coordinates reading unit block as shown in FIG. 5(a) are arranged and displayed in a matrix form on the electronic blackboard shown in FIG. 3. The electronic chalk 9 photographs the display screen on which the two-dimensional code patterns are displayed in a matrix form every photographing range RM corresponding to the size of the coordinates reading unit block, thereby obtaining the coordinate position information. At this time, in the case where the photographing range RM by the image sensor 91 includes all of the coordinates reading unit blocks as shown in FIG. 5(a), that is, in the case where the photographing range RM is in a state as shown in FIG. 20, the coordinates information extracting circuit 96 of the electronic chalk 9 fetches the bits X1 to X9 and the bits Y1 to Y8 in the coordinates reading unit block as coordinate position information as they are. In the case where the photographing range RM respectively includes a part of a plurality of coordinates reading unit blocks which are adjacent to each other, first, the coordinates information extracting circuit 96 fetches the bits X1 to X9 or the bits Y1 to Y8 existing in the state of 3×3 pixel blocks shown in FIG. 5(d) or FIG. 5(e) in the photographing range RM as coordinate position information. That is, for example, in the case where the photographing range RM is in a state as shown in FIG. 18, the coordinates information extracting circuit 96 fetches the bits Y1 to Y8 existing in the region surrounded by bold lines. In the case where the photographing range RM is in a state as shown in FIG. 19, the coordinates information extracting circuit 96 fetches the bits X1 to X9 existing in the region surrounded by bold lines.

In the case where the fetching of the bits X1 to X9 existing in the state of 3×3 pixel blocks as shown in FIG. 5(d) in the photographing range RM is executed, the coordinates information extracting circuit 96 subsequently fetches the bits Y1 to Y8 from among the bits Y belonging to the coordinates reading unit blocks which are laterally adjacent to each other in the photographing range RM. For example, when the photographing range RM is in the state as shown in FIG. 19, the coordinates information extracting circuit 96 fetches the bits Y1, Y4, and Y7 belonging to the lower right coordinates reading unit block in FIG. 19 and the bits Y2, Y3, Y5, Y6, and Y8 belonging to the coordinates reading unit block which is neighboring on the left side of the coordinates reading unit block. In the case where the fetching of the bits Y1 to Y8 existing in the state of 3×3 pixel blocks as shown in FIG. 5(*e*) in the photographing range RM is executed, the coordinates information extracting circuit 96 subsequently fetches the bits X1 to X9 as a combination from among the bits X belonging to the coordinates reading unit blocks which are vertically adjacent to each other in the photographing range RM. For example, when the photographing range RM is in the state as shown in FIG. 18, the coordinates information extracting circuit 96 fetches the bits X1, X2, and X3 belonging to the lower right coordinates reading unit block in FIG. 18 and the bits X4 to X9 belonging to the coordinates reading unit block which is neighboring on the upper side of the coordinates reading unit block.

As for the coordinate positions of each of the coordinates reading unit blocks, in the coordinates reading unit blocks which are mutually neighboring in the lateral direction, the coordinate positions in the Y direction (vertical direction) are the same, and in the coordinates reading unit blocks which are mutually neighboring in the vertical direction, the coordinate positions in the X direction (lateral direction) are the same. In the case where the photographing range RM by the image sensor 91, therefore, exists at such a position where it includes a part of a plurality of coordinates reading unit blocks which are mutually neighboring as shown in FIG. 18 or FIG. 19, missing portions among the bits X1 to X9 (Y1 to Y8) showing the coordinate positions are extracted from the adjacent coordinates reading unit blocks and compensated.

Even if the photographing range of the image sensor 91 which photographs the display screen of the PDP 100, therefore, has a size corresponding to the coordinates reading unit block as shown in FIG. 5(*a*) and even if the reading is executed at any position on the display screen, the coordinate position information can be obtained. According to the invention, therefore, as compared with the case where in order to always read all of the coordinates reading unit blocks, the regions of the number which is a few times as large as the region of the coordinates reading unit block are photographed and the coordinate position information is extracted, an amount of data serving as a processing target is smaller, so that the high speed reading is executed.

Although each coordinates reading unit block is constructed by the block of (8×8) pixels in the embodiment, the size of block is not limited to the block of (8×8) pixels. The rotation detection pattern to be formed in each block is not limited to the crosswise form as shown in FIG. 5(*a*). For example, it may be a pattern surrounding X coordinate patterns and Y coordinate patterns arranged in the first to fourth quadrant regions as shown in FIG. 21(*a*). In the coordinates reading unit block, a boundary pattern as shown in FIG. 21(*b*), a rotation detection pattern as shown in FIG. 21(*c*), an X coordinate pattern as shown in FIG. 21(*d*), and a Y coordinate pattern as shown in FIG. 21(*e*) are combined. As a boundary pattern, a pattern in which all pixels are set to the turn-off state as shown in FIG. 21(*b*) may be used. Further, a predetermined pattern in which the pixels showing the turn-on state and the pixels showing the turn-off state exist mixedly may be used.

Figure 22:
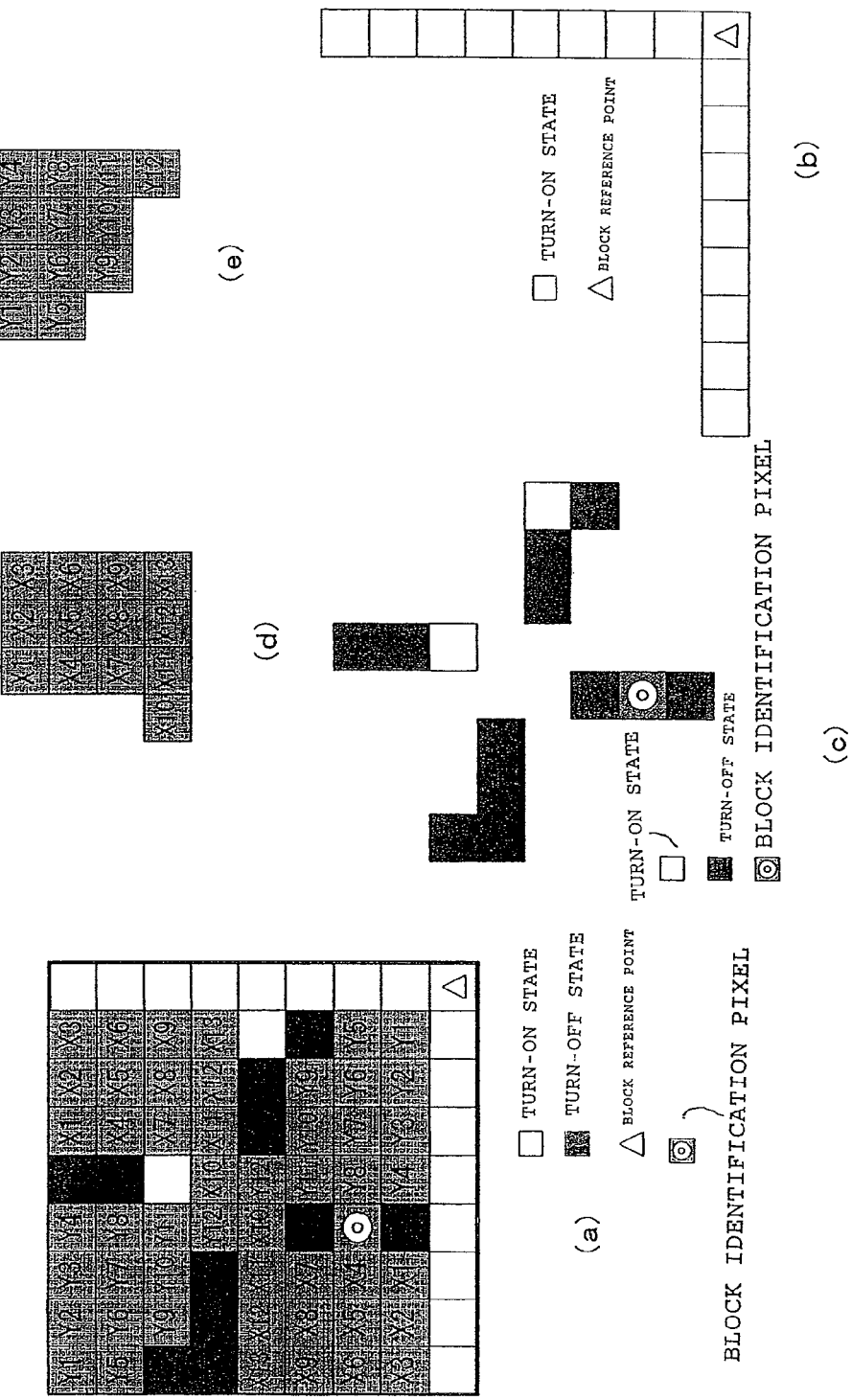
{FIG. 22} Diagram showing another example of the coordinates reading unit block.

As a coordinates reading unit block, a coordinates reading unit block as shown in FIG. 22(*a*) in which a boundary pattern as shown in FIG. 22(*b*), a rotation detection pattern as shown in FIG. 22(*c*), an X coordinate pattern as shown in FIG. 22(*d*), and a Y coordinate pattern as shown in FIG. 22(*e*) are combined may be used.

In the rotation detection pattern as shown in FIG. 22(*c*), besides the pixels which are fixedly set into the turn-on state or the turn-off state, a pixel which is set into the turn-on state or the turn-off state corresponding to the identification of the information data expressed by the two-dimensional code pattern (hereinbelow, such a pixel is referred to as a block identification pixel) is arranged at a predetermined position (shown by double circles).

That is, although the information expressed by the two-dimensional code pattern is the coordinate position on the display screen of the PDP 100 in the embodiment, by using the block identification pixel, other information can be also provided on the display screen of the PDP 100 together with the coordinate position information.

For example, a URL (Uniform Resource Locator) of various Web pages on the Internet is displayed onto the display screen of the PDP 100 by the two-dimensional code patterns as mentioned above together with the coordinate position information. In this instance, URL information of the Web page is also preliminarily stored in the coordinates data memory 6 shown in FIG. 3 together with the coordinates data. In an electronic blackboard mode, the two-dimensional code converting circuit 7 converts the coordinates data into the pixel drive data GD0 corresponding to the coordinates reading unit block (the block identification pixel is fixed to the turn-on state) as shown in FIG. 22(*a*). In a Web page display mode, the two-dimensional code converting circuit 7 converts the URL information into the pixel drive data GD0 corresponding to the coordinates reading unit block (the block identification pixel is fixed to the turn-off state) as shown in FIG. 22(*a*). In the electronic blackboard mode, therefore, the display showing each coordinate position in the display screen is performed on the display screen of the PDP 100 by the form of the coordinates reading unit block as shown in FIG. 22(*a*) (the block identification pixel is fixed to the turn-on state). In the Web page display mode, the display showing the various URL information is performed by the form of the coordinates reading unit block as shown in FIG. 22(*a*) (the block identification pixel is fixed to the turn-off state). In the electronic chalk 9 for reading the coordinates reading unit block, the two-dimensional code data CDD formed by the image processing circuit 94 is directly transmitted to the electronic blackboard side through the radio transmitting circuit 98 without passing through the coordinates information extracting circuit 96. In this instance, the image data forming circuit 11 of the electronic blackboard detects each of the coordinates reading unit blocks as shown in FIG. 22(*a*) on the basis of the two-dimensional code data CDD received by the receiving circuit 10 and discriminates whether or not the block identification pixel in the coordinates reading unit block indicates the turn-on state. If it is decided that the block identification pixel indicates the turn-on state, first, the image data forming circuit 11 executes a coordinates information extracting process similar to that in the coordinates information extracting circuit 96, thereby obtaining the coordinates data. The image data forming circuit 11 forms the image data showing the straight line or curve which traces sequentially each of the coordinate positions shown by the coordinates data and supplies it as a display image data signal $D_{TR}$ to the image superimposing circuit 2. At this time, therefore, when the tip portion of the electronic chalk 9 is moved while making the tip portion come into contact with the display screen of the PDP 100, the image of the straight line or curve along its moving locus is displayed on the display screen of the PDP 100 as shown in FIG. 7(*b*).

If it is decided that the block identification pixel indicates the turn-off state, first, the image data forming circuit 11 executes a coordinates information extracting process similar to that in the coordinates information extracting circuit 96 to the two-dimensional code data CDD, thereby obtaining the URL information. The image data forming circuit 11 accesses the Internet by the URL shown by the URL information, thereby obtaining the pixel data showing the Web page corresponding to the URL, and supplies it as a display image data signal $D_{TR}$ to the image superimposing circuit 2. The Web page corresponding to the URL displayed in the portion with which the tip portion of the electronic chalk 9 has been come into contact on the display screen of the PDP 100 is, consequently, displayed on the display screen of the PDP 100. At this time, by displaying the URL information corresponding to the different Web pages into a plurality of regions in the display screen of the PDP 100, the various kinds of Web pages can be displayed.

Figure 23:
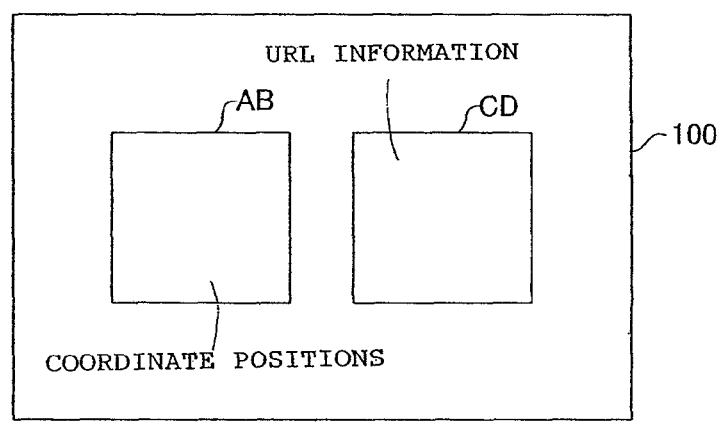
{FIG. 23} Diagram showing a display example in the case where coordinate position information and URL information are converted into two-dimensional code patterns and respectively displayed in different other image regions in a display screen of the PDP 100.

In the display screen of the PDP 100, in an image region AB shown in FIG. 23, the two-dimensional code pattern showing the coordinate position information may be displayed by the form as shown in FIG. 22(*a*) (the block identification pixel is fixed to the turn-on state) and, in an image region CD, the URL information and the Web pages as mentioned above may be displayed by the form as shown in FIG. 22(*a*) (the block identification pixel is fixed to the turn-off state). At this time, although two kinds of information (coordinates information, URL information) can be provided by providing the block identification pixel of one pixel into each coordinates reading unit block in FIG. 22(*a*), it is also possible to construct in such a manner that three or more kinds of information can be provided by allocating a plurality of pixels as a block identification pixel.

Although a construction in which the block identification pixel is included in the rotation detection pattern as shown in FIG. 22(*a*) is used, it is not limited to this example but the block identification pixel may be included in, for example, the X coordinate pattern or the Y coordinate pattern.

When the two-dimensional code patterns based on the coordinates reading unit blocks as mentioned above are displayed onto the whole plane of the PDP 100, in order to suppress a deterioration in phosphor in the pixels belonging to the boundary pattern which is always set into the light emitting state, a reference position of each coordinates reading unit block in the display screen may be changed in accordance with the turn-on or turn-off pattern by the block identification pixel.

A horizontal directional parity bit and a vertical directional parity bit for error correction can be also included in the bit group X showing the coordinate positions in the X direction and the bit group Y showing the coordinate positions in the Y direction as mentioned above, respectively. Similarly, each of the bit group X and the bit group Y may be an error correction coded code such as Reed Solomon code or BCH code. In this instance, the coordinates information extracting circuit 96 forms a bit group, as coordinates data ZD, obtained by executing an error correcting process corresponding to the various systems as mentioned above to each of the bit group X and the bit group Y stored in the X coordinate register and the Y coordinate register.

In the embodiment, as shown in FIG. 5(*a*), the X coordinate patterns each showing the same X coordinate are arranged in the first quadrant region and the third quadrant region which are formed by the rotation detection pattern and the Y coordinate patterns each showing the same Y coordinate are arranged in the second quadrant region and the fourth quadrant region, respectively. In dependence on the bit patterns showing the coordinate positions, therefore, there is a case where the region in which a plurality of coordinates reading unit blocks each containing many pixels in the light emitting state are respectively neighboring and the region in which a plurality of coordinates reading unit blocks each containing many pixels in the turn-off state are respectively neighboring appear in one display screen, and a state where the light emission amounts are uneven is perceived. In order to uniform the light emission amounts of the whole display screen, therefore, when the same X coordinate is allocated to each of the first quadrant region and the third quadrant region, the bit patterns showing the coordinate positions are mutually inverted. Further, when the same Y coordinate is allocated to each of the second quadrant region and the fourth quadrant region, the bit patterns showing the coordinate positions are mutually inverted. For example, when the X coordinate is equal to "8", the bits X1 to X9 of nine bits "000001000" are allocated to the first quadrant region and the bits X1 to X9 of nine bits "111110111" obtained by inverting those bits are allocated to the third quadrant region. When the Y coordinate is equal to "13", the bits Y1 to Y8 of eight bits "00001011" are allocated to the second quadrant region and the bits Y1 to Y8 of eight bits "11110100" obtained by inverting those bits are allocated to the fourth quadrant region. In each coordinates reading unit block, consequently, since the light emitting patterns in the first (or second) quadrant region and the light emitting patterns in the third (or fourth) quadrant region are in the mutually inverted states, the light emission amounts of the respective coordinates reading unit blocks in one display screen are uniformed.

In the embodiment, the pattern obtained by arranging the two-dimensional code patterns as shown in FIG. 8 in a matrix form is displayed on the PDP 100 and by photographing the display screen, the information based on the two-dimensional code patterns is obtained. The information, however, can be also similarly obtained from a sheet surface on which the two-dimensional code patterns are arranged in a matrix form.

In the embodiment, although the directions of the X and Y orthogonal coordinate axes in the coordinates reading unit block are made coincident with the horizontal and vertical directions on the display screen, it is not always necessary that both of them coincide.

Figure 24:
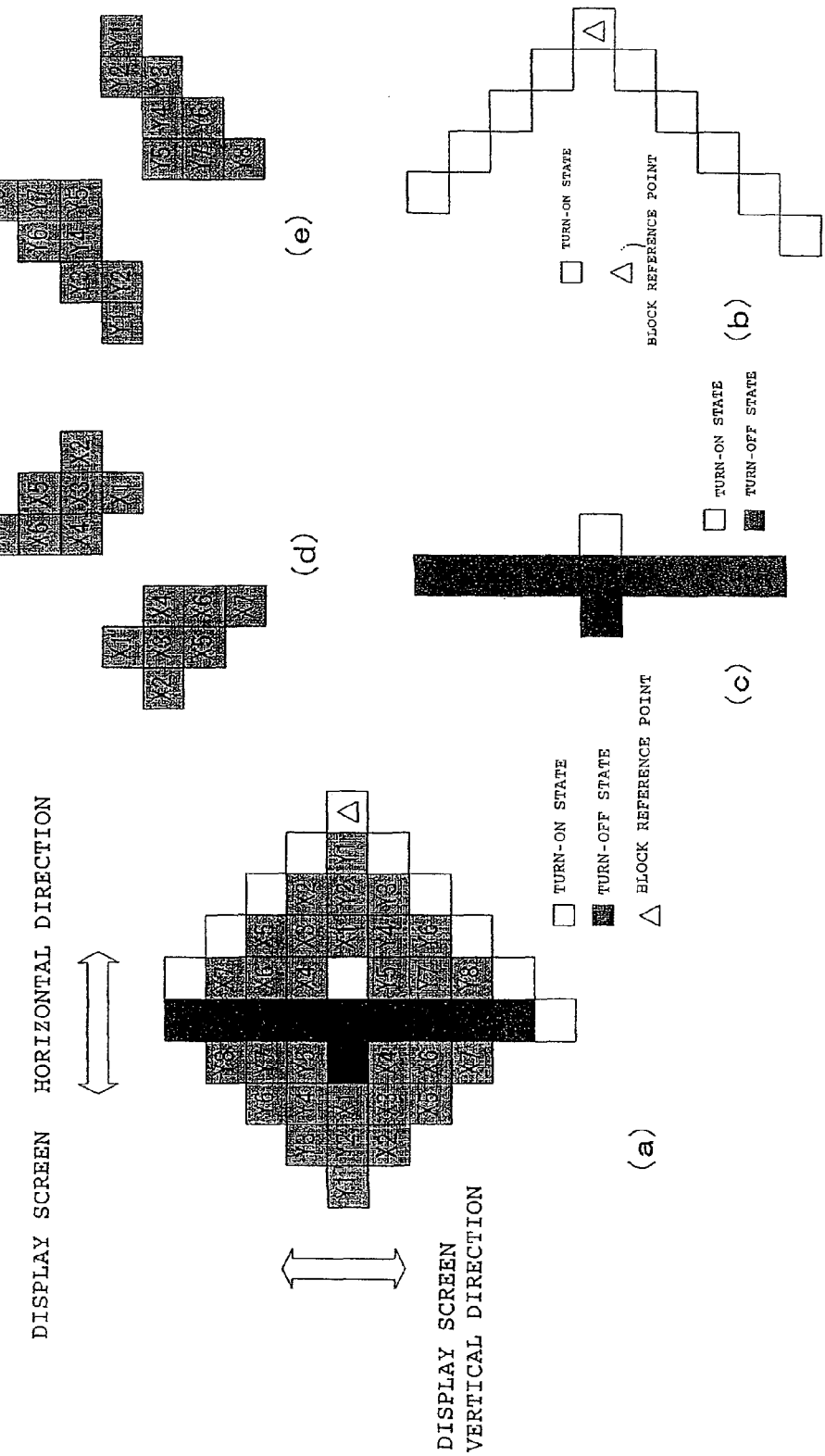
{FIG. 24} Diagram showing another example of the coordinates reading unit block.

For example, a coordinates reading unit block as shown in FIG. 24(*a*) in which a boundary pattern as shown in FIG. 24(*b*), a rotation detection pattern as shown in FIG. 24(*c*), an X coordinate pattern as shown in FIG. 24(*d*), and a Y coordinate pattern as shown in FIG. 24(*e*) are combined may be used.

Industrial Applicability

In the system for reading out the information codes by photographing the information codes displayed on the display, the information codes can be read at a high speed.

The invention claimed is:

1. A two-dimensional code pattern constructed by blocks of pixels arranged in N columns×M rows, comprising:
 a boundary pattern in which each pixel belonging to a predetermined first pixel group in each of said blocks is set into a turn-on state or a turn-off state by a predetermined light emitting pattern showing a boundary position;
 a rotation detection pattern in which each pixel belonging to a predetermined second pixel group in each of said blocks is set into the turn-on state or the turn-off state by a light emitting pattern which can detect a rotational angle upon reading of said block; and
 an information pattern in which in each of first to fourth quadrant regions in said block, both of each of said pixels belonging to said first quadrant region and each of said pixels belonging to said third quadrant region are set into the turn-on state or the turn-off state according to first information data and both of each of said pixels belonging to said second quadrant region and each of said pixels belonging to said fourth quadrant region are set into the turn-on state or the turn-off state according to second information data.

2. A two-dimensional code pattern according to claim 1, wherein said first pixel group is constructed by a plurality of pixels arranged in an endmost column in said block and a plurality of pixels arranged in an endmost row.

3. A two-dimensional code pattern according to claim 1, wherein said second pixel group is constructed by a plurality of pixels arranged crosswise so as to divide each of said first to fourth quadrant regions.

4. A two-dimensional code pattern according to claim 3, wherein at least one identification pixel which is set into the turn-on or turn-off state according to a kind of said two-dimensional code pattern is included in said block.

5. A two-dimensional code pattern according to claim 4, wherein said identification pixel is included in said rotation detection pattern.

6. A two-dimensional code pattern according to claim 1, wherein said second pixel group is constructed by a plurality of pixels arranged so as to surround said first to fourth quadrant regions.

7. A two-dimensional code pattern according to claim 6, wherein at least one identification pixel which is set into the turn-on or turn-off state according to a kind of said two-dimensional code pattern is included in said block.

8. A two-dimensional code pattern according to claim 7, wherein said identification pixel is included in said rotation detection pattern.

9. A two-dimensional code pattern according to claim 1, wherein at least one identification pixel which is set into the turn-on or turn-off state according to a kind of said two-dimensional code pattern is included in said block.

10. A two-dimensional code pattern according to claim 9, wherein said identification pixel is included in said rotation detection pattern.

11. A display device for displaying a two-dimensional code pattern constructed by blocks of pixels arranged in N columns×M rows, wherein
said two-dimensional code pattern includes:
a boundary pattern in which each pixel belonging to a predetermined pixel group in each of said blocks is set into a turn-on state or a turn-off state by a predetermined light emitting pattern showing a boundary position;
a rotation detection pattern in which each pixel belonging to a predetermined second pixel group in each of said blocks is set into the turn-on state or the turn-off state by a light emitting pattern which can detect a rotational angle upon reading of said block; and
an information pattern in which in each of first to fourth quadrant regions in said block, both of each of said pixels belonging to said first quadrant region and each of said pixels belonging to said third quadrant region are set into the turn-on state or the turn-off state according to first information data and both of each of said pixels belonging to said second quadrant region and each of said pixels belonging to said fourth quadrant region are set into the turn-on state or the turn-off state according to second information data, and
said display device has a display panel and display driving means for displaying a plurality of said two-dimensional code patterns in a display screen of said display panel in a matrix form.

12. A display device of the two-dimensional code pattern, according to claim 11, wherein at least one identification pixel which is set into the turn-on or turn-off state according to a kind of said two-dimensional code pattern is included in said block.

13. A display device of the two-dimensional code pattern, according to claim 12, wherein said identification pixel is included in said rotation detection pattern.

14. A display device according to claim 12, wherein said display driving means changes a reference position of each of said two-dimensional code patterns to be displayed in said display screen by said identification pixel.

15. A display device according to claim 11, wherein
said two-dimensional code pattern comprises at least two first two-dimensional code pattern and second two-dimensional code pattern in which forms of said first to fourth quadrant regions in said block differ, and
said display driving means arbitrarily switches a display based on said first two-dimensional code pattern and a display based on said second two-dimensional code pattern every predetermined period of time and executes the display.

16. A display device according to claim 7, wherein
said two-dimensional code pattern comprises at least two first two-dimensional code pattern and second two-dimensional code pattern in which forms of said first to fourth quadrant regions in said block differ, and
while executing a display based on said first two-dimensional code pattern in a first region in said display screen, said display driving means executes a display based on said second two-dimensional code pattern in a second region different from said first region in said display screen.

17. A reading device for reading a two-dimensional code pattern from a display screen or printed matter on which a plurality of two-dimensional code patterns each of which is constructed by blocks of pixels arranged in N columns×M rows are arranged and displayed in a matrix form,
wherein each of said two-dimensional code patterns includes a boundary pattern in which each pixel belonging to a predetermined pixel group in each of said blocks is set into a turn-on state or a turn-off state by a predetermined light emitting pattern showing a boundary position, a rotation detection pattern in which each pixel belonging to a predetermined second pixel group in each of said blocks is set into the turn-on state or the turn-off state by a light emitting pattern which can detect a rotational angle upon reading of said block, and an information pattern in which in each of first to fourth quadrant regions in said block, both of each of said pixels belonging to said first quadrant region and each of said pixels belonging to said third quadrant region are set into the turn-on state or the turn-off state according to first information data and both of each of said pixels belonging to said second quadrant region and each of said pixels belonging to said fourth quadrant region are set into the turn-on state or the turn-off state according to second information data, and
said reading device comprises:
an image sensor for obtaining a photograph image signal obtained by photographing said display screen or said printed matter every photographing range corresponding to said block;
means for detecting a point, as a block reference point, at which said boundary patterns cross each other from said photograph image signal; and
means for respectively extracting said first information data and said second information data on the basis of the turn-on state and the turn-off state of each of said pixels belonging to a region corresponding to an existing position of said block reference point in said photographing range.

* * * * *